(12) United States Patent
Toh et al.

(10) Patent No.: US 12,067,772 B2
(45) Date of Patent: Aug. 20, 2024

(54) METHODS AND APPARATUS FOR VENUE BASED AUGMENTED REALITY

(71) Applicant: Google LLC, Mountain View, CA (US)

(72) Inventors: Steven Soon Leong Toh, Alameda, CA (US); Brandon Hyman, Alameda, CA (US); Eric Lai-Ong-Teung, Mountain View, CA (US); Brian Collins, San Francisco, CA (US); Edgar Chung, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/453,117

(22) Filed: Nov. 1, 2021

(65) Prior Publication Data

US 2022/0051022 A1 Feb. 17, 2022

Related U.S. Application Data

(63) Continuation of application No. 15/929,470, filed on May 4, 2020, now Pat. No. 11,163,997.

(Continued)

(51) Int. Cl.
*G06K 9/00* (2022.01)
*G06T 7/73* (2017.01)
(Continued)

(52) U.S. Cl.
CPC ............... *G06V 20/20* (2022.01); *G06T 7/74* (2017.01); *G06T 7/75* (2017.01); *G06T 15/205* (2013.01);
(Continued)

(58) Field of Classification Search
CPC .. G06V 20/20; G06T 7/74; G06T 7/75; G06T 15/205; G06T 19/006
(Continued)

(56) References Cited

U.S. PATENT DOCUMENTS

| 9,911,238 B2 | 3/2018 | Doronichev et al. |
| 10,012,505 B2 | 7/2018 | Dayal et al. |

(Continued)

FOREIGN PATENT DOCUMENTS

| AU | 2013334573 B2 * | 3/2017 | ......... G06K 9/00671 |
| CN | 107111740 A | 8/2017 | |

(Continued)

OTHER PUBLICATIONS

International Search Report and Written Opinion for PCT Application No. PCT/US2020/070024, dated Sep. 11, 2020, 16 pages.

(Continued)

*Primary Examiner* — Javid A Amini
(74) *Attorney, Agent, or Firm* — Brake Hughes Bellermann LLP

(57) ABSTRACT

In one general aspect, a method can include capturing first features associated with a real-world physical area as a model and associating an AR object with a fixed location within the model. The method can include capturing second features associated with a real-world location corresponding with a portion of the real-world physical area. The method can include associating the captured second features with a location in the model, corresponding with the real-world location, as an AR anchor where the AR object is associated with the AR anchor.

21 Claims, 17 Drawing Sheets

Related U.S. Application Data

(60) Provisional application No. 62/843,495, filed on May 5, 2019.

(51) Int. Cl.
  *G06T 15/20* (2011.01)
  *G06T 19/00* (2011.01)
  *G06V 20/20* (2022.01)
  *H04N 5/232* (2006.01)
  *H04N 23/698* (2023.01)

(52) U.S. Cl.
  CPC ......... *G06T 19/006* (2013.01); *H04N 23/698* (2023.01); *G06T 2215/16* (2013.01)

(58) Field of Classification Search
  USPC .......................................................... 345/633
  See application file for complete search history.

(56) References Cited

U.S. PATENT DOCUMENTS

| | | | |
|---|---|---|---|
| 10,037,699 B1 | 7/2018 | Toyoda et al. | |
| 10,482,674 B1* | 11/2019 | Wu | G09B 25/00 |
| 10,984,604 B2* | 4/2021 | Drouin | G02B 27/0172 |
| 11,055,919 B2* | 7/2021 | Nattinger | G06V 10/764 |
| 11,100,712 B2* | 8/2021 | Barros | G06K 7/1417 |
| 11,144,760 B2* | 10/2021 | Grant | G06V 20/70 |
| 11,151,792 B2* | 10/2021 | Nattinger | G06V 20/20 |
| 2004/0113935 A1 | 6/2004 | O'Neal et al. | |
| 2005/0160368 A1 | 7/2005 | Liu et al. | |
| 2010/0045701 A1 | 2/2010 | Scott et al. | |
| 2010/0203868 A1 | 8/2010 | Sagie et al. | |
| 2011/0121068 A1 | 5/2011 | Emanuel et al. | |
| 2011/0221771 A1 | 9/2011 | Cramer et al. | |
| 2012/0108332 A1 | 5/2012 | Baseley et al. | |
| 2012/0164938 A1 | 6/2012 | Jeong et al. | |
| 2012/0218300 A1 | 8/2012 | Hayakawa | |
| 2012/0249528 A1 | 10/2012 | Park et al. | |
| 2013/0002717 A1 | 1/2013 | Deffeyes et al. | |
| 2013/0083066 A1 | 4/2013 | Aoki et al. | |
| 2013/0141461 A1 | 6/2013 | Salter et al. | |
| 2013/0155108 A1 | 6/2013 | Williams et al. | |
| 2013/0215148 A1 | 8/2013 | Antonyuk et al. | |
| 2013/0271560 A1 | 10/2013 | Diao et al. | |
| 2013/0290421 A1 | 10/2013 | Benson et al. | |
| 2014/0046829 A1 | 2/2014 | Serban et al. | |
| 2014/0089850 A1 | 3/2014 | Gorstan et al. | |
| 2014/0111544 A1 | 4/2014 | Hammond | |
| 2014/0210856 A1 | 7/2014 | Finn et al. | |
| 2014/0215356 A1 | 7/2014 | Brander et al. | |
| 2014/0241599 A1 | 8/2014 | Chen et al. | |
| 2014/0282220 A1* | 9/2014 | Wantland | G06F 3/011 715/782 |
| 2015/0023602 A1* | 1/2015 | Wnuk | G06V 20/20 382/190 |
| 2015/0029180 A1 | 1/2015 | Komatsu | |
| 2015/0046822 A1 | 2/2015 | Tokash et al. | |
| 2015/0062120 A1 | 3/2015 | Reisner-Kollmann et al. | |
| 2015/0070391 A1 | 3/2015 | Nishimaki et al. | |
| 2015/0116355 A1 | 4/2015 | Hofmann et al. | |
| 2015/0127486 A1 | 5/2015 | Advani | |
| 2015/0301787 A1 | 10/2015 | Greco et al. | |
| 2015/0302645 A1 | 10/2015 | Takeuchi | |
| 2015/0302649 A1 | 10/2015 | Komatsu | |
| 2015/0331576 A1 | 11/2015 | Vinayak et al. | |
| 2016/0048964 A1 | 2/2016 | Kruglick | |
| 2016/0063327 A1 | 3/2016 | Yasutake | |
| 2016/0063764 A1 | 3/2016 | Okamoto et al. | |
| 2016/0180536 A1 | 6/2016 | Yamaguchi | |
| 2016/0217590 A1 | 7/2016 | Mullins et al. | |
| 2016/0300392 A1 | 10/2016 | Jonczyk et al. | |
| 2016/0335275 A1 | 11/2016 | Williams et al. | |
| 2016/0337599 A1 | 11/2016 | Williams et al. | |
| 2017/0061692 A1 | 3/2017 | Giraldi et al. | |
| 2017/0186235 A1 | 6/2017 | Chu | |
| 2017/0206691 A1 | 7/2017 | Harrises et al. | |
| 2017/0337735 A1 | 11/2017 | Goslin | |
| 2017/0345167 A1* | 11/2017 | Ard | G06T 19/006 |
| 2018/0025544 A1 | 1/2018 | Schoeller et al. | |
| 2018/0135986 A1 | 5/2018 | Dayal et al. | |
| 2018/0260020 A1 | 9/2018 | Kamhi et al. | |
| 2018/0270631 A1 | 9/2018 | High et al. | |
| 2018/0293771 A1 | 10/2018 | Piemonte et al. | |
| 2019/0026948 A1 | 1/2019 | Kellogg et al. | |
| 2019/0065027 A1 | 2/2019 | Hauenstein et al. | |
| 2019/0114802 A1* | 4/2019 | Lazarow | H04W 56/001 |
| 2019/0156577 A1 | 5/2019 | Barros et al. | |
| 2019/0178654 A1 | 6/2019 | Hare | |
| 2019/0220665 A1* | 7/2019 | Neumann | G06Q 10/02 |
| 2019/0221030 A1 | 7/2019 | Griffin et al. | |
| 2019/0295315 A1 | 9/2019 | Levinson et al. | |
| 2019/0333275 A1* | 10/2019 | Wang | G06T 7/20 |
| 2019/0354699 A1* | 11/2019 | Pekelny | H04L 63/0861 |
| 2020/0104028 A1* | 4/2020 | Vats | G06F 3/04845 |
| 2020/0249819 A1* | 8/2020 | Berquam | G06T 19/006 |
| 2020/0311428 A1* | 10/2020 | Rom | G06T 15/04 |
| 2020/0364938 A1* | 11/2020 | Martin | G06T 19/006 |

FOREIGN PATENT DOCUMENTS

| | | |
|---|---|---|
| CN | 109195675 A | 1/2019 |
| WO | 2012007764 A1 | 1/2012 |
| WO | 2015016798 A2 | 2/2015 |
| WO | 2016191719 A1 | 12/2016 |

OTHER PUBLICATIONS

Invitation to Pay Additional Fees and Partial International Search for PCT Application No. PCT/US2020/070024, dated Jul. 21, 2020, 9 pages.

"ARCore overview", Google Developers (https://developers.google.com/ar/discover/), Feb. 28, 2019, 3 pages.

"Detecting Images in an Ar Experience", Apple Developer Documentation, retrieved on Jul. 1, 2020 from https://developer.apple.com/documentation/arkit/detecting_images_in_an_ar_experience, 5 pages.

Google, "Share AR Experiences with Cloud Anchors", retrieved on Aug. 31, 2020 from https://developers.google.com/ar/develop/java/cloud-anchors/overview-android, Feb. 28, 2019, 3 pages.

Persson, et al., "Learning Actions To Improve the Perceptual Anchoring of Objects", Frontiers In Robotics and AI, vol. 3, Article 76, Jan. 30, 2017, 17 pages.

Sun, et al., "Motion Removal for Reliable RGB-D Slam in Dynamic Environments", Robotics and Autonomous Systems, vol. 108, Oct. 1, 2018, pp. 115-128.

Wang, et al., "Coarse Semantic-Based Motion Removal for Robust Mapping in Dynamic Environments", IEEE Access, vol. XX, retrieved on Jul. 1, 2020 from https://www.researchgate.net/ publication /340821111_Coarse_Semantic-based_motion_Removal_for_Robust_Mapping_in_Dynamic_Environments, 2017, 17 pages.

Wang, et al., "Simultaneous Localization, Mapping and Moving Object Tracking", Journal of Robotics, 2007, 47 pages.

Wang, "Simultaneous Localization, Mapping and Moving Object Tracking", The International Journal of Robotics Research, vol. 26, No. 9, Apr. 2004, 164 pages.

Wangsiripitak, et al., "Avoiding Moving Outliers in Visual Slam By Tracking Moving Objects", IEEE Int Conf on Robotics and Automation, Kobe, Japan, 2009, 6 pages.

Yang, et al., "Robust RGB-D Slam in Dynamic Environment Using Faster R-CNN", 3rd IEEE International Conference on Computer and Communications (ICCC), Dec. 1, 2017, pp. 2398-2402.

First Examination Report for Indian Application No. 202147031120, dated Mar. 9, 2022, 7 pages.

First Examination Report for Indian Application No. 202248051285, mailed Dec. 12, 2023, 5 pages.

(56) References Cited

OTHER PUBLICATIONS

First Office Action (with English translation) for Chinese Application No. 202080000860.9, mailed Jun. 5, 2024, 17 pages.

* cited by examiner

METHODS AND APPARATUS FOR VENUE BASED AUGMENTED REALITY

CROSS-REFERENCE TO RELATED APPLICATIONS

This application is a continuation of, and claims priority to, U.S. patent application Ser. No. 15/929,470, filed on May 4, 2020, entitled "METHODS AND APPARATUS FOR VENUE BASED AUGMENTED REALITY", which claims priority to U.S. Provisional Patent Application No. 62/843,495, filed on May 5, 2019, the disclosures of which are incorporated by reference herein in their entireties.

BACKGROUND

Placing an augmented reality (AR) object in the proper context within an image of a real-world scene viewed through a mobile device of a user can be complicated. Specifically, placing the AR object in the proper location and/or orientation within the display can be difficult to achieve. A global positioning system (GPS) of a mobile device of a user can be used to identify a location of the user and the location of the user can then be used to place AR objects associated with objects within the display of the user.

SUMMARY

In one general aspect, a method can include receiving a representation of a real-world scene captured by a user using a mobile device where the real-world scene is a portion of a real-world physical area. The method can include associating a location of the mobile device with an AR anchor based on a comparison of the representation of the real-world scene with a portion of a model of the real-world physical area. The method can include triggering display of an AR object associated with the model of the real-world physical area within the mobile device based on the location of the mobile device.

BRIEF DESCRIPTION OF THE DRAWINGS

FIGS. 6A through 7B illustrate real-world scenes with AR objects for wayfinding.

DETAILED DESCRIPTION

Figure 1:
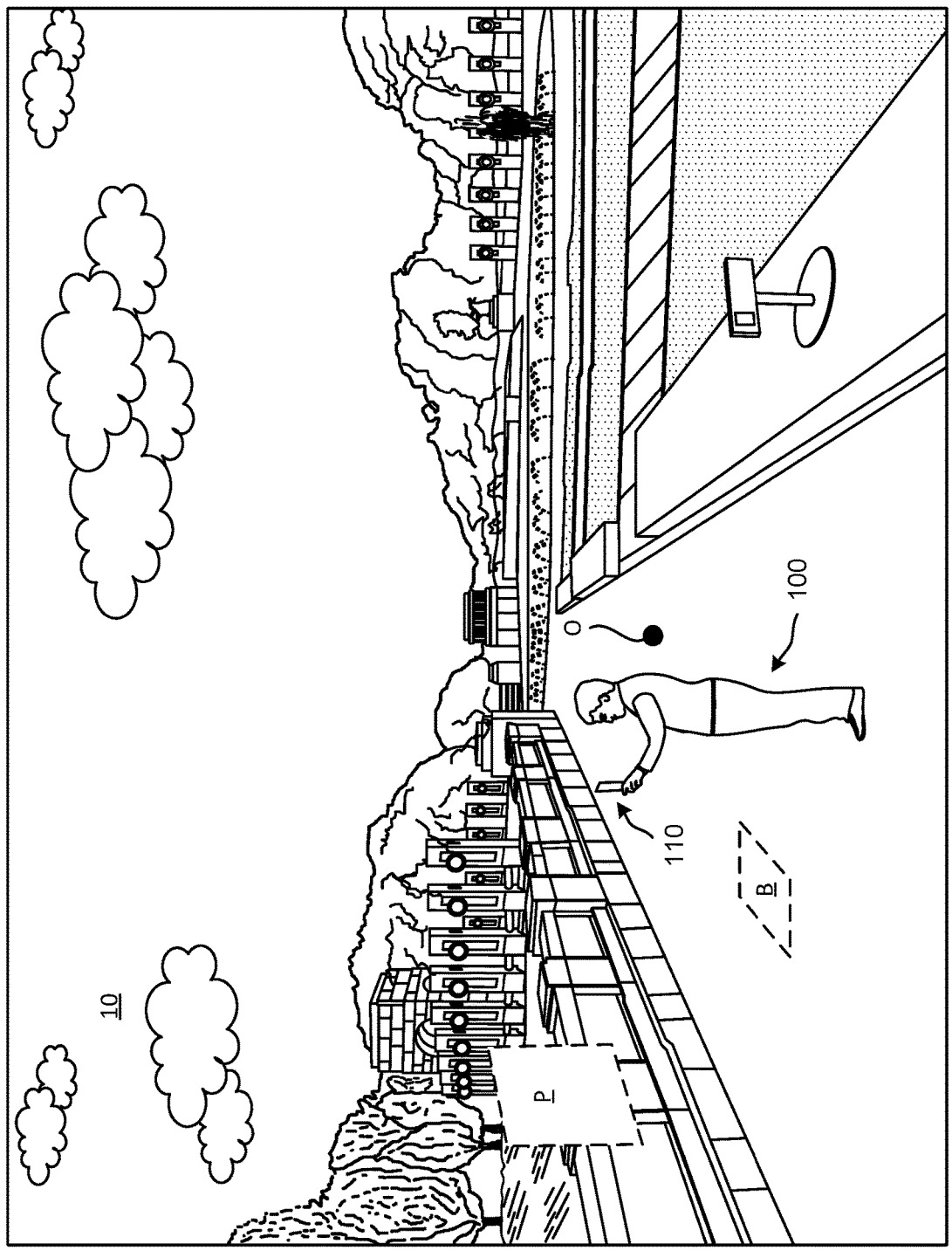
FIG. 1 is a diagram of a user within a physical area viewing an AR object localized against an AR anchor.

Placing an augmented reality (AR) object in the proper location and/or orientation within an image of a real-world scene viewed through a mobile device of a user can be difficult to achieve. A global positioning system (GPS) of a mobile device of a user can be used to identify a location of the user and the location of the user can then be used to place AR objects associated with objects within the display of the user. However, GPS may not be available and/or sufficiently accurate in some situations (e.g., in a building with multiple floors). For example, when a device is indoors, GPS generally may not be used to localize the device position accurately (e.g., accurately to a particular floor). Also, many venues are not open to the public and/or may not be well documented. Some information about a venue may not be reliable because a proprietor of the venue may not have the resources to maintain accurate information about the venue. Information about a venue may only be produced with expensive equipment and/or specialized technology. After such information is produced it may be relatively static and difficult to modify or update. Without accurate mapping, location, and/or orientation information associated with a venue, an application cannot properly place AR objects of the place and/or event within the display of the device.

The technical solutions described herein are related to processing of multiple perception signals to display augmented reality content (e.g., AR objects) for, for example, wayfinding and/or discovery at a venue (e.g., a location, physical space, region, area). Specifically, the accurate positioning and orientation of place and/or event information enables the use of augmented reality displays for use with, for example, wayfinding and/or information discovery. In some implementations, the contextual display in AR assists users in wayfinding at unfamiliar places and/or discovering events or places of interest when on location.

To achieve accurate placement of AR objects (also can be referred to as points of interest (POIs)), a scale-accurate digital 3D representation of the venue is generated and a location and/or orientation of a user can be localized to the scale-accurate digital 3D representation via AR anchors (e.g., an AR anchor has a fixed location with respect to an origin, wherein the origin is a predefined, fixed location in a real-world physical area). The 3D representation can then be transformed into the view space of a device of a user and the AR objects can be displayed in proper context within the real world using augmented reality. In some implementations, the AR object rendered appears anchored to the physical element the AR object is pointing to, labeling, and/or so forth.

In some implementations, physical signage can be used to facilitate resolving location and/or orientation. Signs that exist in physical space, are defined and placed in the digital map representation, which are then uniquely identified by usage of perception technologies (e.g., image and/or text recognition). In such implementations, the methods and apparatus described herein may not require an operator to 3D map the space, and can instead rely on a floorplan and information of where signs are positioned and oriented.

The methods and apparatus described herein have technical advantages over existing mapping applications that use, for example, GPS and Wi-Fi to localize the device. Specifically, the solutions described herein are configured to precisely localize a user device when a GPS signal is not available (or cannot be used when multiple floors in an interior space are involved), and does not require extra networking equipment to function. The methods and apparatus described herein also have advantages over use of the magnetometer sensor to orient the device's direction (e.g., the magnetometer sensor may be relatively inaccurate, and/or may be impaired by local magnetic fields). The methods and apparatus described herein have advantages over existing augmented reality platform technologies and over existing machine learning technologies, which recognize and read text. In some implementations, the methods and apparatus described herein allow for a proprietor of a venue to update information about a venue (e.g., locations of AR objects and physical objects) without the need for operators to scan the space. The methods and apparatus described herein have advantages over products that rely primarily on GPS that fail to localize a user device position and/or orientation accurately when GPS is not available.

FIG. 1 is a diagram of a user 100 within a real-world physical area 10 (e.g., a real-world venue) viewing an AR object P through a mobile device 110. The location (e.g., location and/or orientation, and/or distance and orientation) of the user 100 is localized against a location of an AR anchor B, which has a fixed location with respect to an origin O. The origin O is at a fixed location within the real-world physical area 10, which is modeled by a 1:1 scale model or representation. The 1:1 scale model (e.g., model map) of the real-world physical area 10 can be referred to as a full-scale model (e.g., a scale-accurate model or representation). The AR object P has a fixed location within the full-scale model of the real-world physical area 10. Unless otherwise indicated, references to a model are considered the same as a reference to a full-scale model.

In some implementations, a location can include a location in X, Y, Z coordinates, and an orientation can include a directional orientation (e.g., direction(s) or angle(s) that an object or user is facing, a yawl, pitch, and roll). Accordingly, a user (e.g., user 100) and/or an AR object (e.g., AR object P) can be at a particular X, Y, Z location and facing in particular direction as an orientation at that X, Y, Z location.

The AR object P is displayed properly within (e.g., on a display screen of) the mobile device 110 utilizing a combination of localization of the mobile device 110 of the user 100 (can be referred to as localization of the user 100 and/or localization of the mobile device 110) to the AR anchor B, the origin O, the full-scale model of the real-world physical area 10, and the fixed location of the AR object P within the full-scale model of the real-world physical area 10. In some implementations, the origin O can be a common origin (e.g., anchor) to which the AR anchor B and the full-scale model of the real-world physical area 10 can be oriented (e.g., fixedly tied, bound). In addition, AR objects such as AR object P can also be included (at fixed locations and orientations (e.g., X, Y, and Z coordinate orientations)) within the full-scale model of the real-world physical area 10. Accordingly, the origin O can be used to reconcile (e.g., translate, transform) the locations and/or orientations of AR objects to the mobile device 110 (of the user 100) when the mobile device 110 is localized to the AR anchor B.

For example, in some implementations, a representation of a real-world scene from the real-world physical area 10 can be captured by the user 100 using a camera of the mobile device 110. The real-world scene can be a portion of the real-world physical area 10 captured by a camera (e.g., the camera of the mobile device 110). A location (and/or orientation) of the mobile device 110 can be associated with the AR anchor B based on a comparison (e.g., matching of features) of the representation of the real-world scene with a portion of a full-scale model of the real-world physical area 10. In some implementations, localizing can include determining the location and orientation of the mobile device 110 with respect to the AR anchor B. In some implementations, the location and orientation can include a distance from the AR anchor B and direction the mobile device 110 is facing with respect to the AR anchor B. Because the AR anchor B has a fixed location with respect to the origin O and because the real-world physical area 10 has a fixed location with respect to the origin O, the location and orientation of the mobile device 110 with respect to the real-world physical area 10 can be determined. Thus, the location and the orientation of the mobile device 110 with respect to the AR object P can be determined by way of the AR object P having a fixed location and orientation within the real-world physical area 10. In other words, through localization with the AR anchor B, the orientation of the full-scale model of the real-world physical area 10 and the AR object P around the user 100 can be determined via the origin O. The AR object P can then be displayed, at the proper location and orientation, within the mobile device 110 to the user 100. Changes in the location and orientation of the mobile device 110 can be determined through sensors (e.g., inertial measurement units (IMU's), cameras, etc.) and can be used to update locations and/or orientations of the AR object P (and/or other AR objects).

Figure 2:
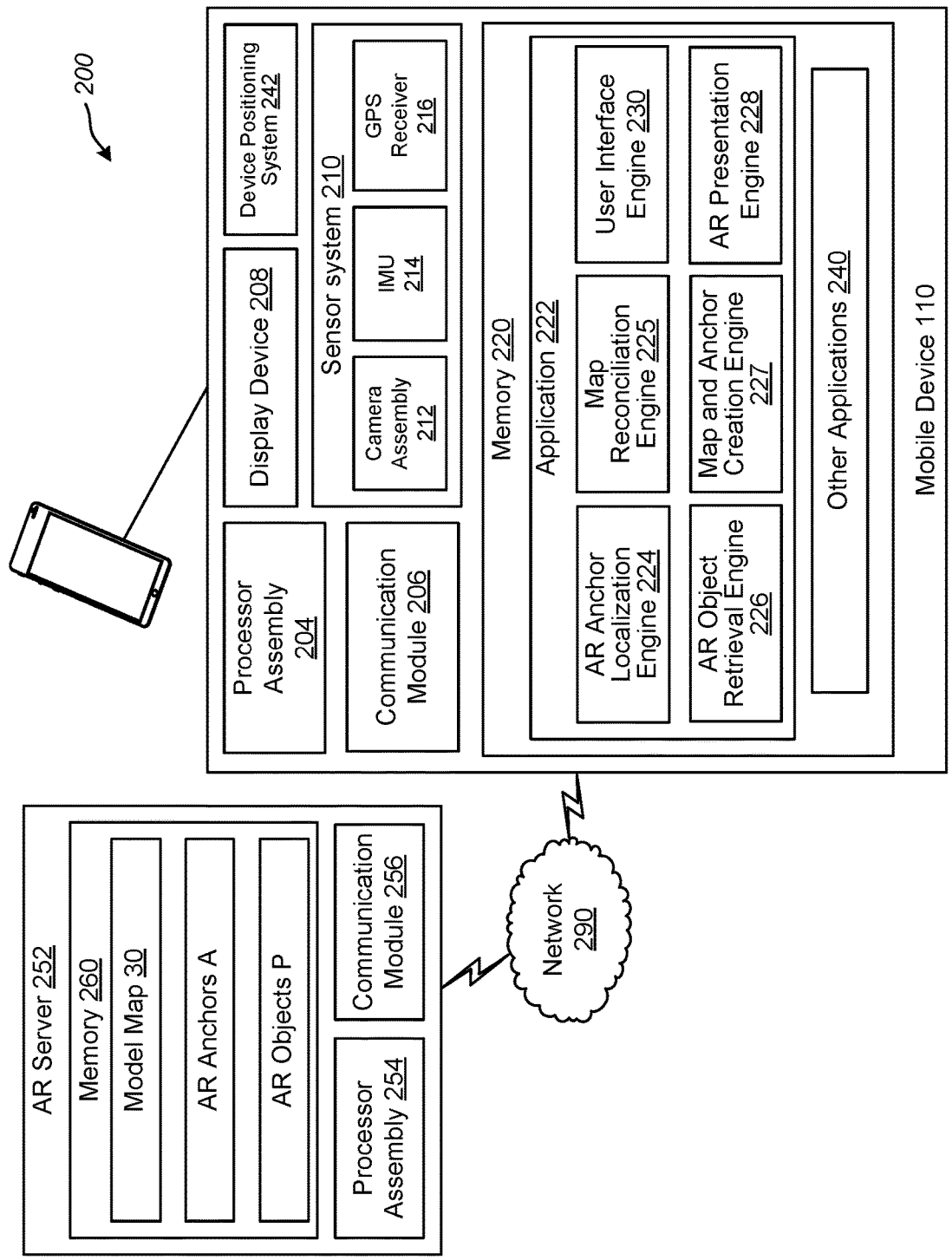
FIG. 2 is a block diagram illustrating a system configured to implement the concepts described herein.

FIG. 2 is a block diagram illustrating a system 200 configured to implement the concepts described herein (e.g., the generic example shown in FIG. 1), according to an example implementation. The system 200 includes the mobile device 110 and an AR server 252. FIG. 2 illustrates details of the mobile device 110 and the AR server 252. Using the system 200, one or more AR objects can be displayed within a display device 208 of the mobile device 110 utilizing a combination of localization of the mobile device 110 to an AR anchor, an origin, a full-scale model of a real-world physical area, and a fixed location and orientation of the AR object within the full-scale model of the real-world physical area. The operations of the system 200 will be described in the context of FIG. 1 and other of the figures.

The mobile device 110 may include a processor assembly 204, a communication module 206, a sensor system 210, and a memory 220. The sensor system 210 may include various sensors, such as a camera assembly 212, an inertial motion unit (IMU) 214, and a global positioning system (GPS) receiver 216. Implementations of the sensor system 210 may also include other sensors, including, for example, a light sensor, an audio sensor, an image sensor, a distance and/or proximity sensor, a contact sensor such as a capacitive sensor, a timer, and/or other sensors and/or different combinations of sensors. The mobile device 110 includes a device positioning system 242 that can utilize one or more portions of the sensor system 210.

The mobile device 110 also includes the display device 208 and the memory 220. An application 222 and other applications 240 are stored in and can be accessed from the memory 220. The application 222 includes an AR anchor localization engine 224, a map reconciliation engine 225, an AR object retrieval engine 226, a map and anchor creation engine 227, AR anchor presentation engine 228, and a user interface engine 230. In some implementations, the mobile device 110 is a mobile device such as a smartphone, a tablet, and/or so forth.

The system illustrates details of the AR server 252, which includes a memory 260, a processor assembly 254 and a communication module 256. The memory 260 is configured to store a model map 30 (can also be referred to as a model), AR anchors A, and AR objects P.

Although the processing blocks shown in AR server 252 and the mobile device 110 are illustrated as being included in a particular device, the processing blocks (and processing associated therewith) can be included in different devices, divided between devices, and/or so forth. For example, at least a portion of the map reconciliation engine 225 can be included in the AR server 252.

The model map 30 stored in the memory can be a three-dimensional (3D) representation (e.g., with depth data) of the real-world physical area 10. In some implementations, the model map 30 can be a black and white, or color image (e.g., with depth data). In some implementations, the model map 30 can be, or can include a panorama (e.g., with depth data). As an example, the panorama may include an image or a set of images (captured at one location) that extend over a wide angle, e.g., over at least 120 degrees, over at least 180 degrees, or even over 360 degrees. In some implementations, the model map 30 can be a point cloud representation that includes points (e.g., a point cloud) in a 3D space that represent the features (e.g., edges, densities, buildings, walls, signage, planes, objects, textures, etc.) within the real-world physical area 10. As described above, the model map 30 can be a 1:1 full scale map of the real-world physical area 10. The model map 30 (and real-world physical area 10) can be a venue (e.g., a park, a portion of a city, a building (or a portion thereof), a museum, a concert hall, and/or so forth).

Figure 3A:
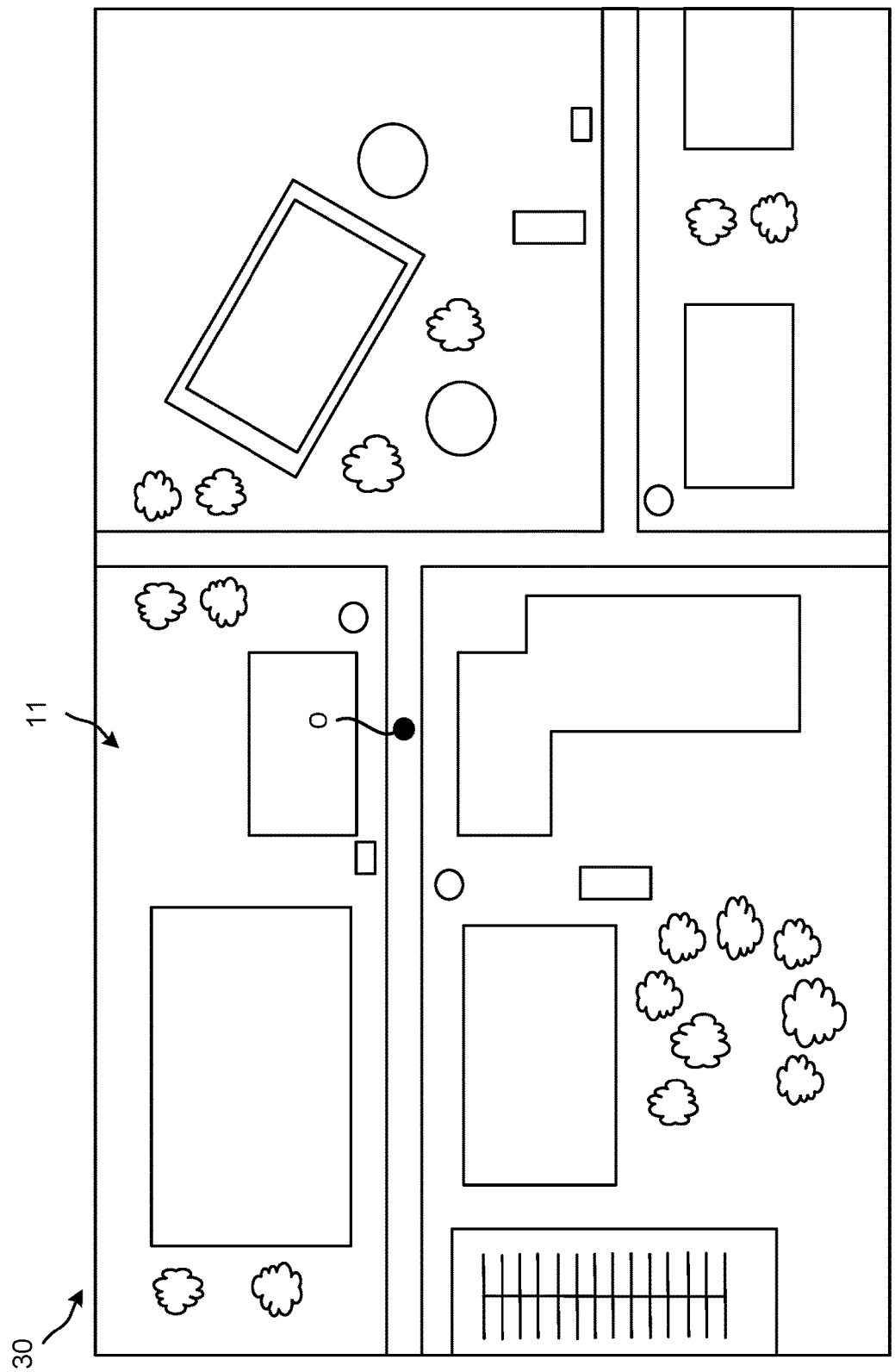
FIG. 3A illustrates an example model map.

FIG. 3A illustrates a representation of an example model map 30 associated with a real-world physical area 11. The representation shown in FIG. 3A is a two-dimensional (2D) top-down view of the model map 30 that includes buildings, streets, trees, etc. An origin O of the model map 30 is shown in FIG. 3A, and the origin O can function as the origin for the relative coordinate system of the model map 30. In other words, the model map 30 can have a coordinate system that is based on the origin O rather than a GPS coordinate system or another absolute coordinate system tied to the actual location of the real-world physical area 11 within the Earth. However, the distances represented within the model map 30 can be real-world distances (e.g., meters). The origin O can be an arbitrary point selected or identified within the model map 30. However, the origin O can be used for reconciliation (e.g., coordinate translations, coordinate transformations) with other coordinate systems.

In some implementations, the model map 30 can be created by capturing video of a real-world physical area 11 using the camera assembly 212 and the map and anchor creation engine 227. In some implementations, the model map 30, which is an accurately scaled (e.g., real-world distances (e.g., meters, centimeters) and scale) digital map can be created from a digital map of a location, an architectural diagram, a floorplan (e.g., technical floorplan) of a venue (e.g., an indoor location, planned build out of an event space, and/or so forth), and so forth. In some implementations, a 2D map can be used (e.g., at least partially used) to generate the 3D model map 30. In some implementations, the model map 30 can be quickly created (e.g., in under an hour) via the mobile device 110 and walk through of the area. This is contrasted with methods that required expensive and complex image capture equipment with specialized capture data. The model map 30, after being captured, can be stored in the AR server 252.

Figure 3B:
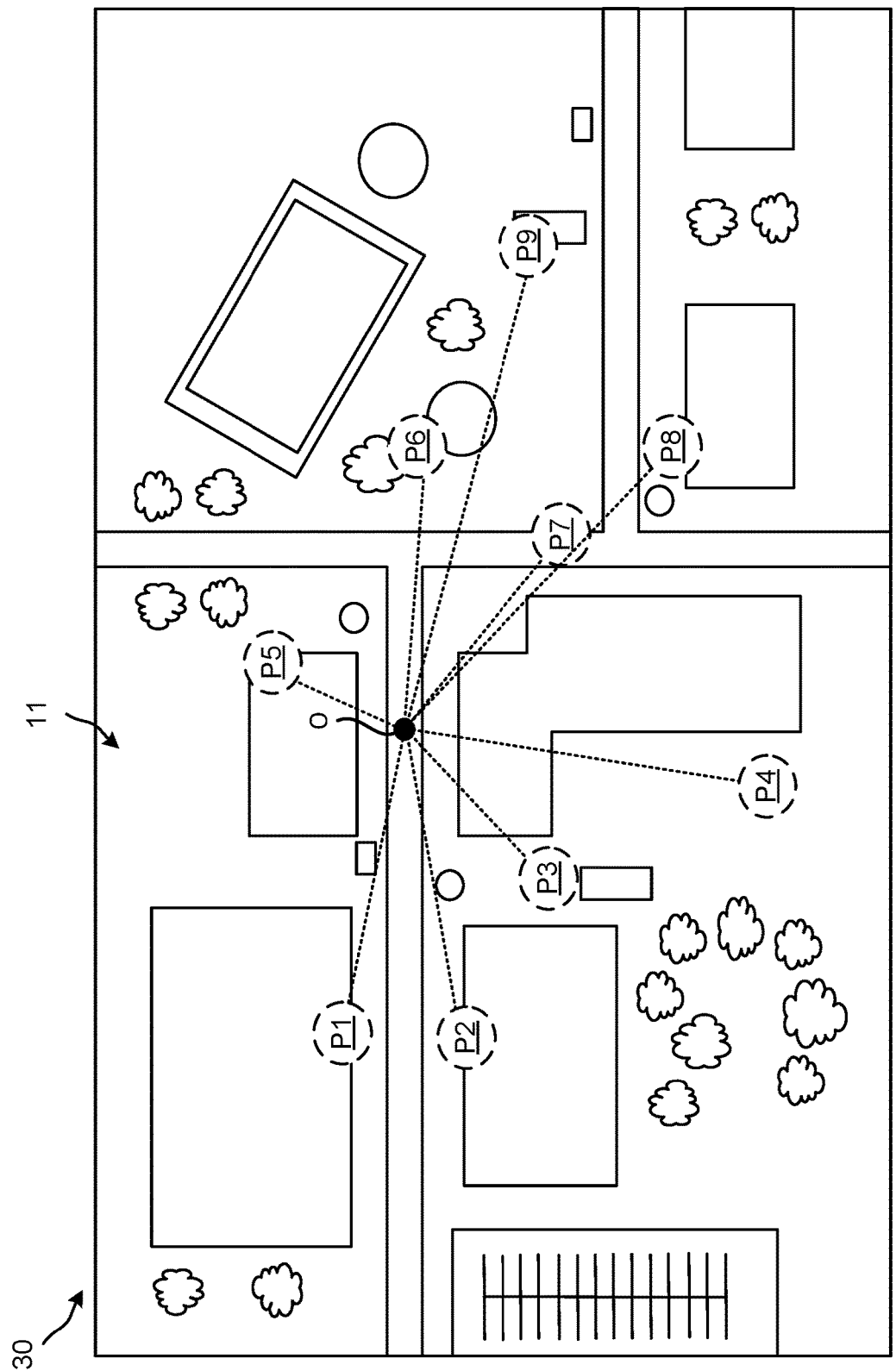
FIG. 3B illustrates AR objects within the model map shown in FIG. 3B.

AR objects P1-P9 (e.g., points of interest) are overlaid on the model map 30 shown in FIG. 3B. The AR objects P1-P9 (which can collectively be referred to as AR objects P) have a fixed location (e.g., X, Y, Z location) and orientation (e.g., direction) within the model map 30. The AR objects P have a fixed location and orientation with respect to the origin O (as illustrated by the dashed lines). In some implementations, the model map 30 includes AR objects P that are relevant to (e.g., associated with, designed for, identify) a place, event, location, and so forth.

In some implementations, at least one of the AR objects P can be configured to move as the mobile device 110 moves user moves or can move even if the mobile device 110 does not move. For example, one of the AR objects P, such as a navigation guide (e.g., a wayfinding arrow) used to guide a user, can have a starting point near (e.g., at, in front of) a location and orientation of the mobile device 110. As the mobile device 110 moves, the navigation guide can also move (e.g., rotate, move in front of the user) to navigate a user to a desired location.

In some implementations, the AR objects P can each be a fixed locations and orientations within a coordinate space of the model map 30. The AR objects P can each be independent of a real-world coordinate space (e.g., latitude and longitude, a GPS coordinate space). Because the AR objects P are at fixed locations and orientations within the coordinate space of the model map 30, the AR objects P are at full-scale locations and orientations. In other words, the AR objects P can each be at fixed locations and orientations within a coordinate space of the model map 30. In some implementations, the AR objects P can be at fixed locations and orientations (in real-world distances) with respect to the origin O. In some implementations, the AR objects P can be within a coordinate space that is independent of that of the model map 30 (but has origin O as a common origin).

In some implementations, the AR objects P can be a label, a 3D model, an interactive immersive model, etc. In some implementations, the AR objects P can be placed within the model map 30. In some implementations, the AR objects P can be placed within the model map 30 to facilitate discovery and/or wayfinding using the AR objects P within the real-world physical area 11.

Figure 3C:
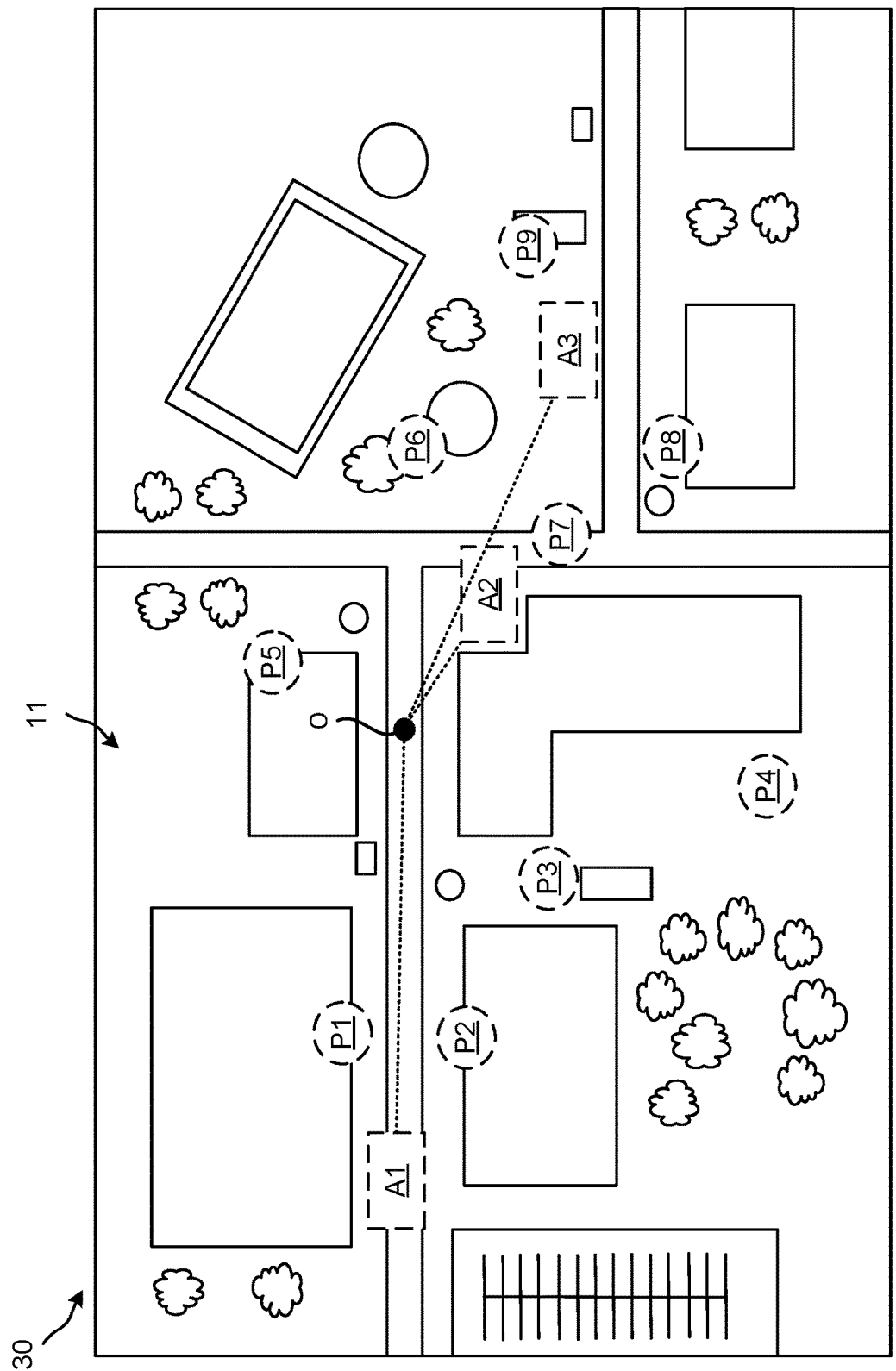
FIG. 3C illustrates AR anchors within the model map shown in FIG. 3A.

AR anchors A1-A3 are overlaid on the model map 30 shown in FIG. 3C. The AR objects P are also shown. The AR anchors A1-A3 (which can collectively be referred to as AR anchors A) have a fixed location (e.g., X, Y, Z location) and orientation (e.g., direction) within the model map 30. The AR anchors P have a fixed location and orientation with respect to the origin O (as illustrated by the dashed lines). As noted above, the origin O can be an arbitrarily selected origin.

The AR anchors A (which can each be unique) can each be a fixed locations (and/or orientations) within a coordinate space of the model map 30. Because the AR anchors A are at fixed locations (and/or orientations) within the coordinate space of the model map 30, the AR anchors A are at full-scale locations (and/or orientations). The AR anchors A can each be a fixed locations (and/or orientations) within a coordinate space of the model map 30. In some implementations, the AR anchors P can be at fixed locations (and/or orientations) with respect to the origin O. In some implementations, the AR anchors P can be within a coordinate space that is independent of that of the model map 30. In some implementations, at a minimum each of the AR anchors P have a location (without an orientation) within the model map 30.

The AR anchors A can be used to localize a user 100 (e.g., a mobile device 110 of the user) to the model map 30. The AR anchors can be considered AR activation markers. The AR anchors A can be created so that the mobile device 110 of the user can be localized to one or more of the AR anchors A. For example, the AR anchors A can be an image and/or a representation associated with a location (e.g., point and/or an area) with the real-world physical area 11 that corresponds with the full-scale model map 30. In some implementations, the AR anchors A (like the model map 30) can be a collection of points (e.g., a point cloud) that represent features (e.g., edges, densities, buildings, walls, signage, planes, objects, textures, etc.) at or near a location (e.g., point and/or an area) within the model map 30. In some implementations, the AR anchors A can be a spherical image (e.g., color image) or panorama associated with a location within the model map 30. In some implementations, one or more of the AR anchors A can be an item of content. In some implementations, the AR anchors A can be one or more features associated with a location within the model map 30.

Because the AR anchors A can be, for example, an image or representation associated with a location (e.g., point and/or an area) within the model map 30, each of the AR anchors A can be considered as having their own, independent coordinate system (rather than a unified coordinate system). In some implementations, the AR anchors A can be a part of a coordinate space that is relative to the AR anchors A (and independent of other coordinate systems). The AR anchors A can each be independent of a real-world coordinate space (e.g., latitude and longitude, a GPS coordinate space). The locations associated with the AR anchors A can be relative (in real-world distances), however, to the origin O. In other words, the AR anchors can be defined with a coordinate space that has an origin common with origin O.

In some implementations, one or more of the AR anchors A can be created by capturing a feature (e.g., an image or a set of images (e.g., a video), a panorama) while the user 100 (holding mobile device 110) physically stands a point and/or an area within a real-world physical area 11. The creation of the AR anchors A can be performed using the map and anchor creation engine 227. The captured feature(s) can then be mapped to a location (e.g., collection of features associated with a location) within the full-scale model map 30 as an AR anchor A. This information can be stored in the AR server 252.

In some implementations, one or more of the AR anchors A within the model map 30 can include uniquely identifiable signs (e.g., physical signs) which will be used as AR activation markers. In some limitations, the signs can include text, QR, custom-designed visual scan codes, and/or so forth. In some implementations, the AR anchors A can be uniquely identifiable physical signs that are connected by location and/or orientation within, for example, the model map 30. The physical signage in a real-world physical area can be used to precisely calibrate the location and/or orientation of the mobile device 110.

As noted above, in some implementations, the model map 30, each of the AR anchors A, and the AR objects P are associated with or are defined within different (e.g., different and independent) coordinates spaces. Accordingly, each of these elements (model map 30, AR anchors A, AR objects P) can be updated dynamically without affecting, in an adverse fashion, the other elements. For example, one or more of the AR anchors A and/or AR objects P can be modified (e.g., updated, deleted, changed) in a desirable fashion. More details regarding dynamic updating are discussed in connection with FIGS. 8 and 9. Because of the independent nature of these coordinate spaces, the locations and orientations of the AR objects P with respect to the mobile device 110 are resolved (e.g., translated, transformed) by a common tie to the model map 30 (and origin O) with the AR anchors A to which the mobile device 110 is localized when in use. This system and method can operate accurately even when the captured data during setup is not complete, has inaccuracies, etc. This is contrasted with other systems which may require complete and very accurate, unified data capture during setup.

Referring back to FIG. 2, the AR anchor localization engine 224 can be configured to determine a location of the mobile device 110 based on a comparison (e.g., matching of features) of a representation of a real-world scene with a portion of the full-scale model map 30 of the real-world physical area. The comparison can include comparison of features (e.g., edges, densities, buildings, walls, signage, planes, objects, textures, etc.) captured through the mobile device 110 with features included in or represented within, for example, the model map 30. In some implementations, the comparison can include comparison of portions of an image captured through the mobile device 110 with portions of an image associated with the model map 30.

The camera assembly 212 can be used to capture images or videos of the physical space such as a real-world scene from the real-world physical area around the mobile device 110 (and user 100) for localization purposes. The camera assembly 212 may include one or more cameras. The camera assembly 212 may also include an infrared camera. In some implementations, a representation (e.g., an image) of a real-world scene from the real-world physical area 10 can be captured by the user 100 using the camera assembly 212 camera of the mobile device 110. The representation of the real-world scene can be a portion of the real-world physical area 10. In some implementations, features (e.g., image(s)) captured with the camera assembly 212 may be used to localize the mobile device 110 to one of the AR anchors 264 stored in the memory 160 of the AR server 252.

Based on the comparison of features, the AR localization engine 224 can be configured to determine the location and/or orientation of the mobile device 110 with respect to one or more of AR anchors A. The location (and/or orientation) of the mobile device 110 can be localized against the location of the AR anchor A through a comparison of an image as viewed through the mobile device 110. Specifically, for example, an image captured by a camera of the mobile device 110 can be used to determine a location and orientation of the mobile device 110 with respect to the AR anchor A.

Figure 4A:
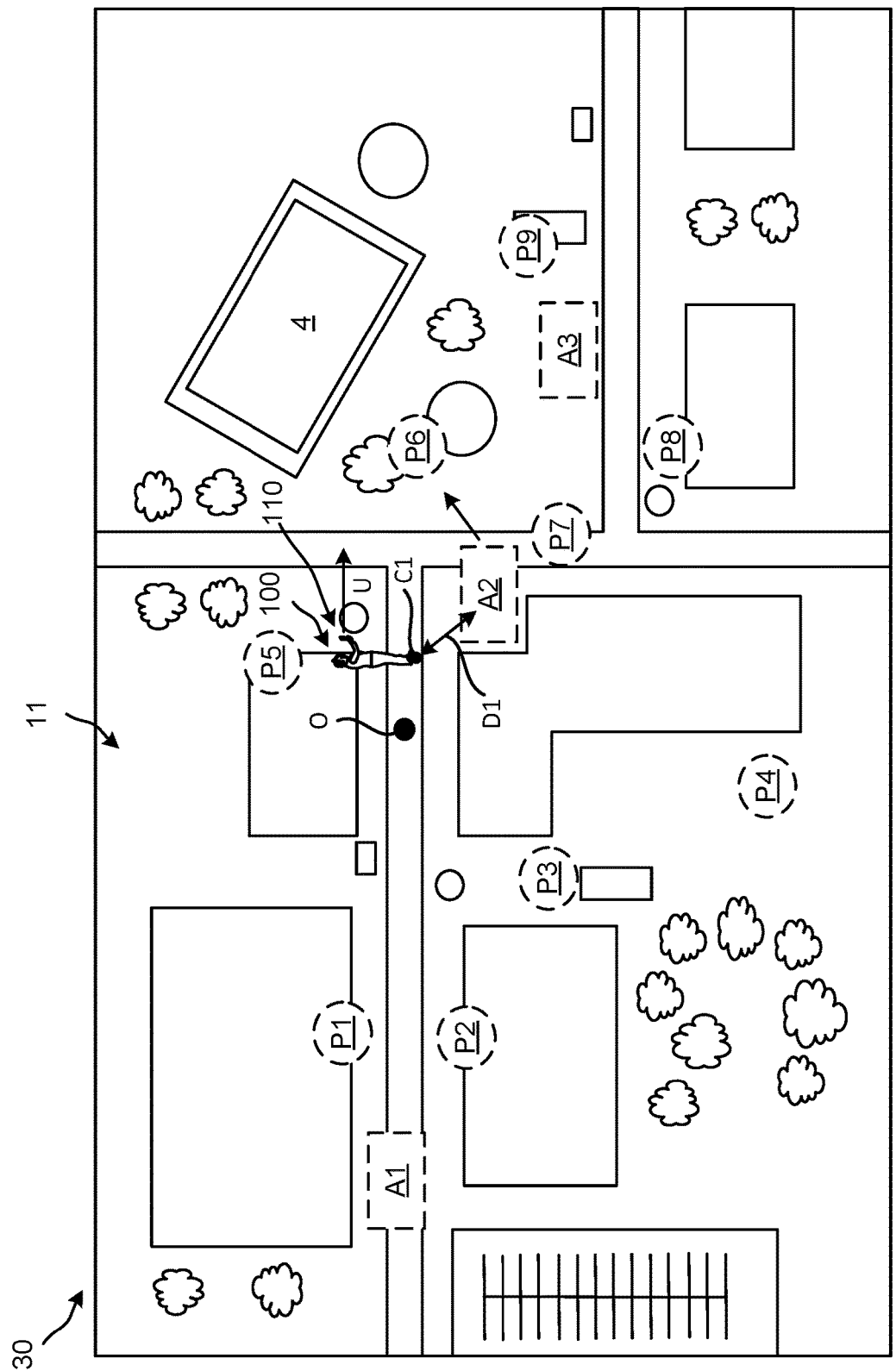
FIG. 4A illustrates localization of a mobile device to one or more AR anchors.

An example of localization is illustrated in FIG. 4A. As shown in FIG. 4A, the user 100 is at a location C1. The location of the user 100 is shown in FIG. 4A within the model map 30 for purposes of explanation and by way of example. But, in reality, the user 100 is in the real-world physical area 11 associated with the model map 30 and is merely represented within FIG. 4A. The user 100 is using the mobile phone 110 to capture an image of an area (e.g., scene) within the real-world physical area 11 using the mobile device 110. The captured image (as an example) of the area (e.g., scene) can be compared with the model map 30 to determine the location C1 of the user and the orientation of the user at that location C1. The location and orientation can include determining a distance D1 that the user 100 is located from the AR anchor A2, and the direction U that the user is facing, which is toward building 4 and to the left of AR anchor A2. The AR anchor A2 can be associated with an image capture that can be compared with the capture of the mobile device 110 along direction U. Based on the comparison of the capture along direction U and the capture associated with the AR anchor A2, the AR anchor localization engine 224 can determine that the mobile device 110 is at distance D1 (and location C1) and facing in direction U relative to the AR anchor A2. Because the AR anchor A2 has a fixed location with respect to the origin O and because the real-world physical area 11 represented within the model map 30 has a fixed location with respect to the origin O, the location and orientation of the mobile device 110 with respect to the real-world physical area 11 can be determined.

Figure 4B:
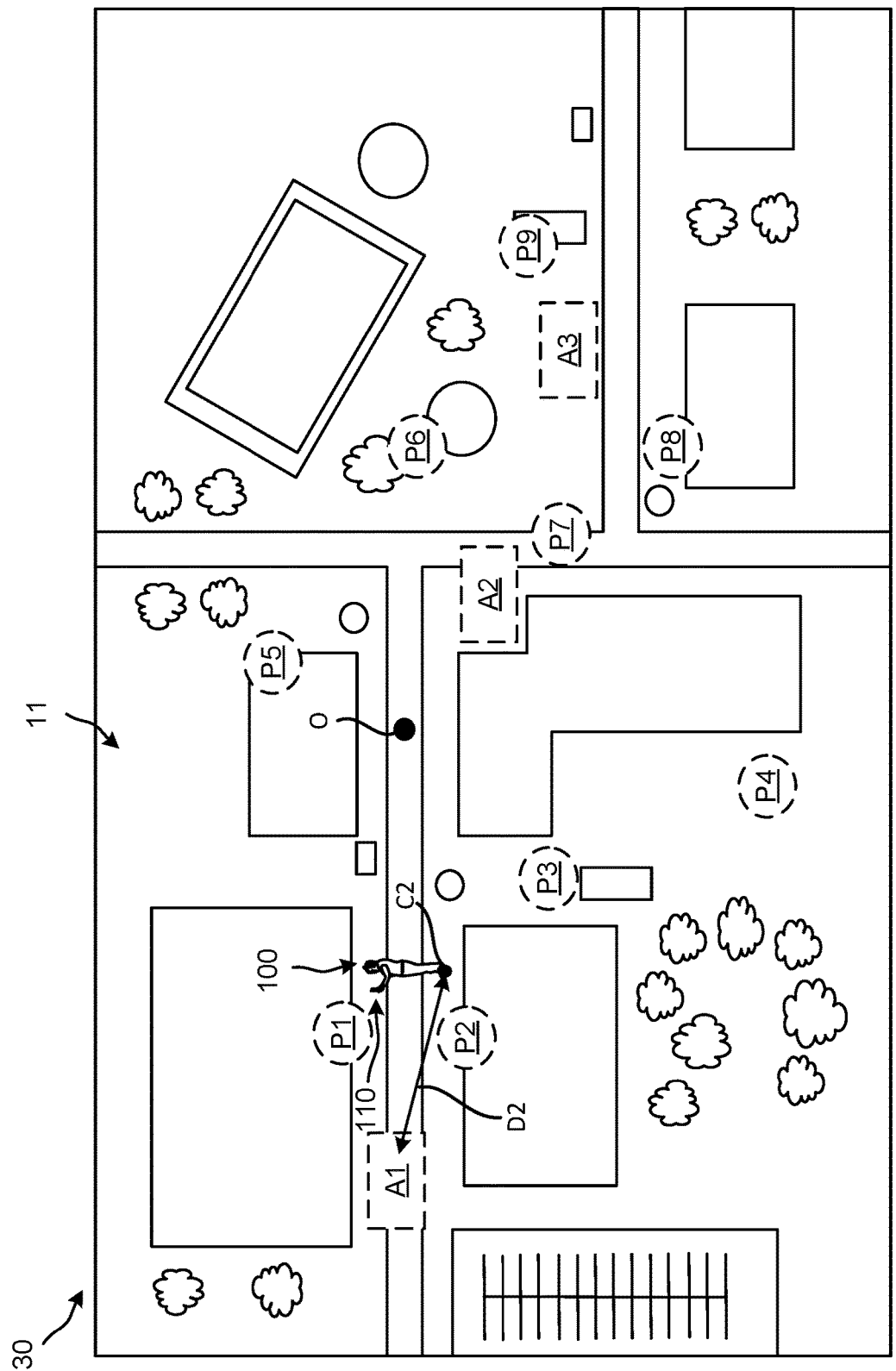
FIG. 4B illustrates updating the localization of the mobile device to an AR anchor based on movement of the mobile device.

In some implementations, the localization of the mobile device 110 to an AR anchor A can be updated based on movement of the user. For example, if the user moves from location C1 in FIG. 4A to location C2 in FIG. 4B, the AR localization engine 224 can be configured to determine the location and/or orientation of the mobile device 110 with respect to the AR anchor A1 as the user moves to location C2 and away from AR anchor A2. In this example, the location of the mobile device 110 is closer to AR anchor A1 than AR anchor A2 when at location C2. The mobile device 110 is a distance D2 from (and facing a direction with respect to) the AR anchor A1.

The updating of the localization can facilitate accuracy of display of the AR objects P within the display of the mobile device 110 of the user 100. As the mobile device 110 moves within the real-world physical area (which corresponds with the model map 30), the location of the user can be inaccurate because of drift in inherent in the sensor systems 210. Dynamically updating the localization of the mobile device 110 against the AR anchors A, the inaccuracies due to drift can be reduced or eliminated.

Figure 4C:
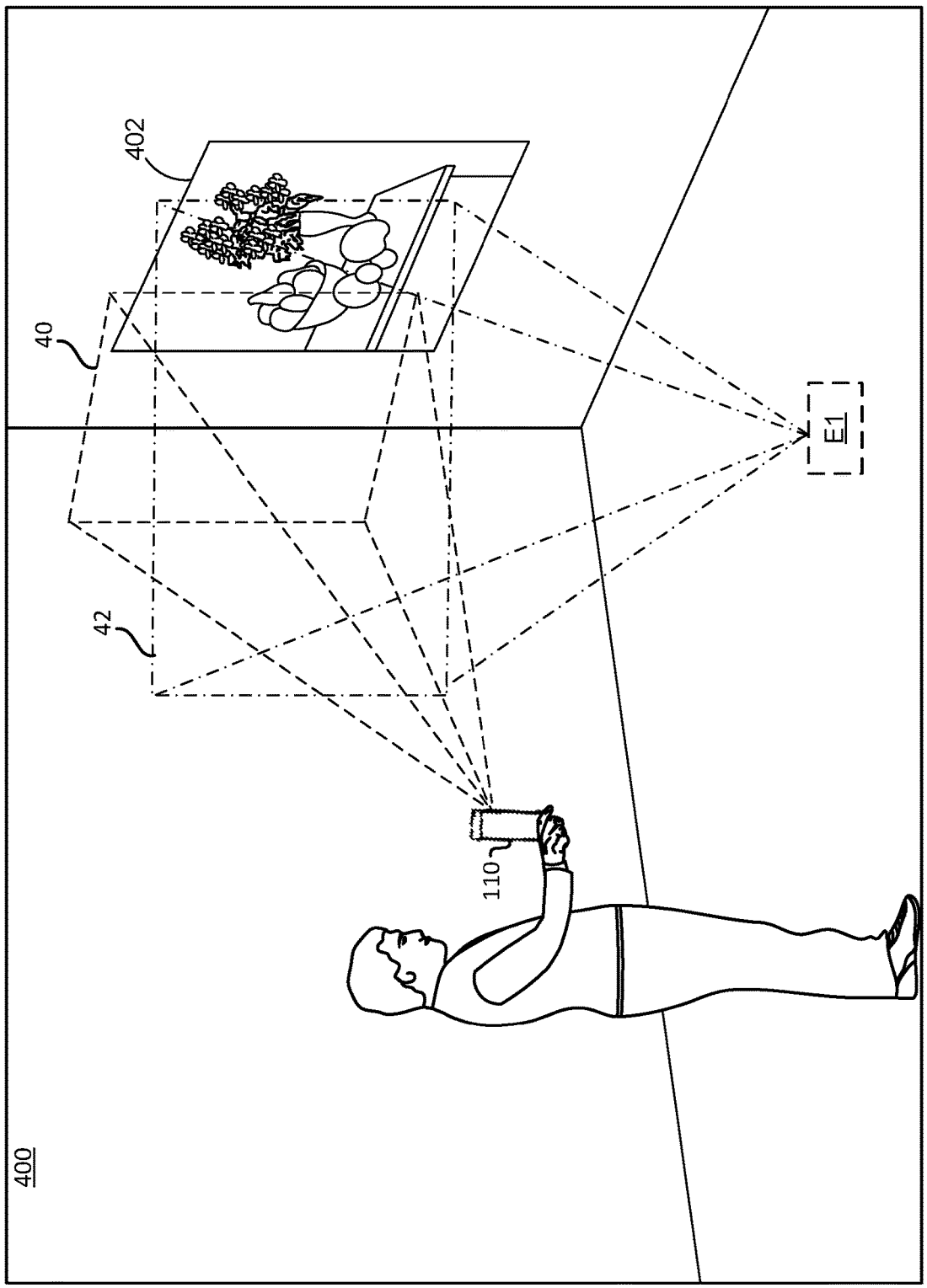
FIG. 4C illustrates another example of localizing to an AR anchor.

Another example of localization is illustrated in FIG. 4C where the mobile device 110 captures a portion of a corner of a wall and a part of a painting 402 (e.g., inside of a building, inside of a building on a particular floor (e.g., of a plurality of floors) of the building). The captured area is shown as area 40. This captured area 40 can be used to localize the mobile device 110 to the AR anchor E1, which was previously captured (e.g., captured by another mobile device) from a different angle and includes overlapping area 42 as illustrated by dash-dot lines. Specifically, the features of the captured area 40 can be compared with the features of the captured area 42 associated with the AR anchor E1, to localize the mobile device 110 to the AR anchor E1.

In some implementations, the AR localization engine 224 can be configured to determine the location and/or orientation of the mobile device 110 with respect to one or more of AR anchors A by attempting to localize against more than one (e.g., all) of the AR anchors A. In some implementations only one AR anchor A is selected for localization when the user is at a specified location (or area) at a given time (or over a time window). The best match AR anchor A can be selected for localization. In some implementations, the best match can be the AR anchor A closest to the mobile device 110. In some implementations, the best match can be the AR anchor A with the most features matched to the model map 30. In some implementations, the AR anchor localization engine 224 determines a confidence score for a recognized AR anchor A. A higher confidence score may indicate that the feature (e.g., image, representation, extracted text, barcode, QR code) from an image is more likely to be associated with the determined AR anchor A than if a lower confidence score is determined.

Even after localizing at one of the AR anchors A, the precise location and orientation of the mobile device 110 within the physical real-world may not be known. Only the relative location and orientation of the mobile device 110 with respect to the AR anchor A (and within the model map 30 by way of the AR anchor A) is known. The ad-hoc capture of feature (e.g., image) information by the mobile device 110 is used to determine the relative location of the mobile device 110. Further reconciliation may be required (e.g., with the mobile map 30) to determine the location and orientation of the mobile device 110 with respect to the AR objects P.

In some implementations, images captured with the camera assembly 212 may also be used by the AR localization engine 224 to determine a location and orientation of the mobile device 110 within a physical space, such as an interior space (e.g., an interior space of a building), based on a representation of that physical space that is received from the memory 260 or an external computing device. In some implementations, the representation of a physical space may include visual features of the physical space (e.g., features extracted from images of the physical space). The representation may also include location-determination data associated with those features that can be used by a visual positioning system to determine location and/or position within the physical space based on one or more images of the physical space. The representation may also include a three-dimensional model of at least some structures within the physical space. In some implementations, the representation does not include three-dimensional models of the physical space.

In some implementations, multiple perception signals (from one or more of the sensor systems 210) can be used by the AR localization engine 224 to uniquely identify signage. In some implementations, these include, but are not limited to: image recognition and tracking, text recognition and tracking, AR tracked oriented points, GPS position, Wifi signals, QR codes, custom designed visual scan codes, and/or so forth. In some implementations, the AR anchor localization engine 224 identifies signage for localization. In some implementations, uniquely identifiable signage associated with the model map 30 can correspond with uniquely identifiable physical signs. In some implementations, the AR anchor localization engine 224 identifies one or more codes, such as a barcode, QR code, or another type of code, within an image. The code may then be mapped to an AR anchor A. In some implementations, this mapping of the digital and physical representations allow for precise localization of the mobile device 110.

After the mobile device 110 of the user 100 has been localized to an AR anchor A, the map reconciliation engine 225 is configured to reconcile the coordinate spaces of the model map 30, the AR objects P, and the AR anchors A. In some implementations, the map reconciliation engine 225 is configured to reconcile the coordinate spaces of the model map 30, the AR objects P, and the AR anchors A based on the common origin O.

For example, the locations and orientations of the AR objects P (which have fixed locations and orientations within the model map 30) with respect to the mobile device 110 can be determined based on the localization of the mobile device 110 to at least one of the AR anchors A, which has a fixed relationship to the origin O and a fixed relationship within the model map 30. In other words, the locations and orientations of the AR objects P with respect to the mobile device 110 are resolved (e.g., translated, transformed) by a common tie to the model map 30 (and origin O) with the AR anchors A to which the mobile device 110 is localized. By doing so, one or more of the AR objects P can be displayed within the mobile device 110 based on the location and orientation of the mobile device 110, even when the mobile device 110 moves within the real-world physical area (and corresponding model map 30).

For example, as shown in FIG. 4A, the location and the orientation of the mobile device 110 with respect to the AR object P6 can be determined by way of the AR object P6 having a fixed location and orientation within the real-world physical area 11 represented by model map 30. In other words, through localization with the AR anchor A2, the orientation of the full-scale model of the real-world physical area 11 and location and orientation of the AR object P6 around the user 100 can be determined via the origin O. The AR object P6 can then be displayed within the mobile device 110 to the user 100. As shown in FIG. 4A, for example, the mobile device 110 (via the user 100) is facing in the direction U as determined through the localization process with the AR anchor A2, and the AR object P6 can be displayed within the display device 208 of the mobile device 110 based on the direction U. Accordingly, the locations and orientations of the AR objects P are displayed within the mobile device 110 as resolved (e.g., transformed, translated) by a common tie to the model map 30 (and origin O) and the AR anchors A to which the mobile device 110 is localized.

Changes in the location and orientation of the mobile device 110 can be determined through sensors (e.g., inertial measurement units (IMU's), cameras, etc.) and can be used to update locations and/or orientations of the AR object P6 (and/or other AR objects P1-P5, P7-P9). For example, if the mobile device 110 is moved to a direction different than direction U, the display of the AR object P6 can be modified within the display device 208 of the mobile device 110 accordingly.

Referring back to FIG. 2, the AR object retrieval engine 226 can be configured to retrieve one or more AR objects P from the AR server 252. For example, the AR object retrieval engine 226 may retrieve AR objects P within the model map 30 based on the reconciliation of the coordinate spaces of the AR objects P, the model map 30, and the AR anchors A performed by map reconciliation engine 225.

The AR object presentation engine 228 presents or causes one or more AR objects P to be presented on the mobile device 110. For example, the AR object presentation engine 228 may cause the user interface engine 230 to generate a user interface that includes information or content from the one or more AR objects P to be displayed by the mobile device 110. In some implementations, the AR object presentation engine 228 is triggered by the AR object retrieval engine 226 retrieving the one or more AR objects P. The AR object presentation engine 228 may then trigger the display device 208 to display content associated with the one or more AR objects P.

The user interface engine 230 can be configured to generate user interfaces. The user interface engine 230 may also cause the mobile device 110 to display the generated user interfaces. The generated user interfaces may, for example, display information or content from one or more of the AR objects P. In some implementations, the user interface engine 230 generates a user interface including multiple user-actuatable controls that are each associated with one or more of the AR objects P. For example, a user may actuate one of the user-actuatable controls (e.g., by touching the control on a touchscreen, clicking on the control using a mouse or another input device, or otherwise actuating the control).

Figure 5B:
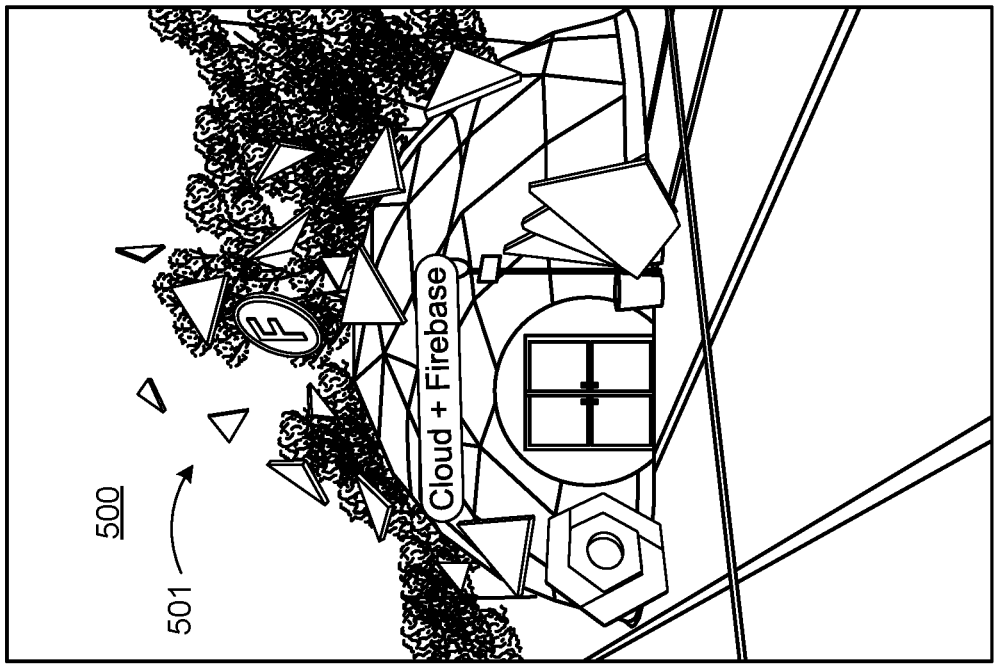
FIGS. 5A and 5B illustrates a real-world scene without and with an AR object, respectively.
Figure 5A:
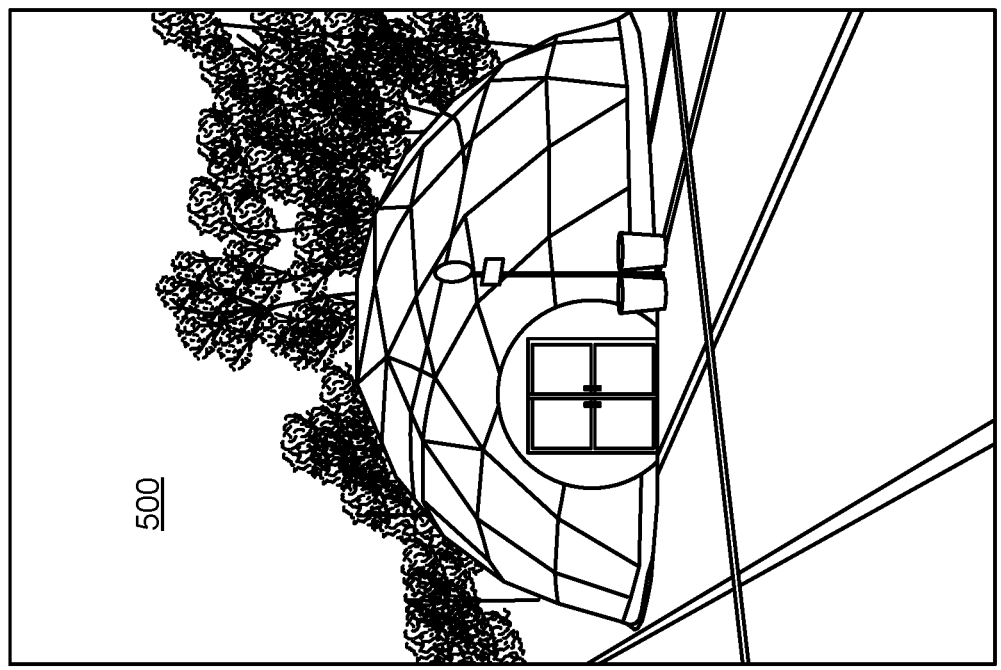

An example of an AR object 501 displayed within a real-world scene 500 is shown in FIG. 5B. The AR object 501 can be stored at an AR server 252. The real-world scene 500 without the AR object 501 is shown in FIG. 5A.

Figure 6B:
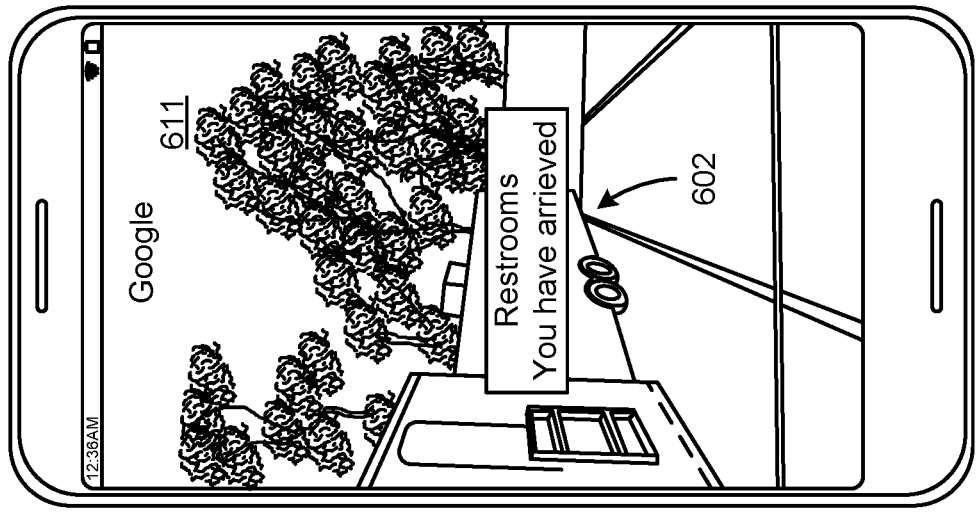
Figure 6A:
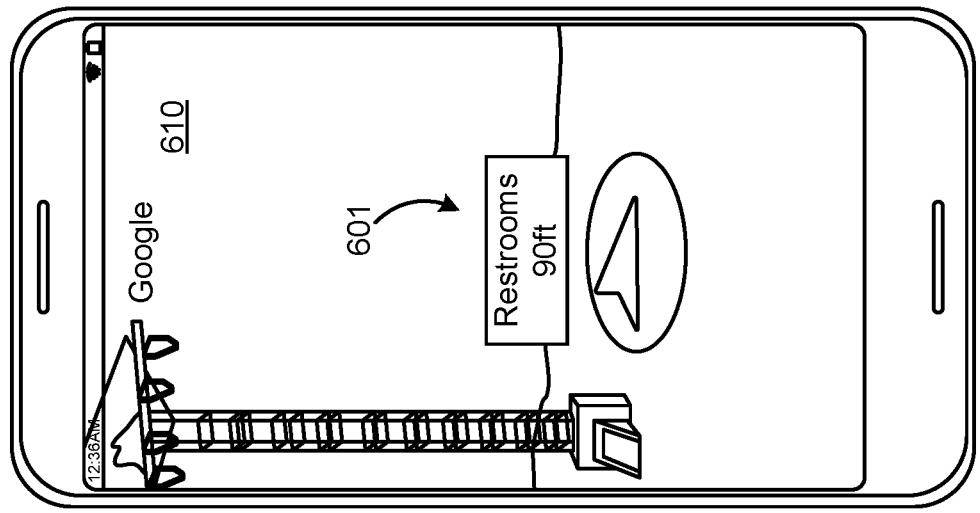

An example of AR objects 601 and 602 displayed within a real-world scenes 610, 611 are shown in FIGS. 6A, and 6B, respectively. Specifically, AR objects 601 and 602 are related to wayfinding. Such AR objects 601, 602 can be stored in and accessed from the AR server 252.

Figures 7A, 7B:
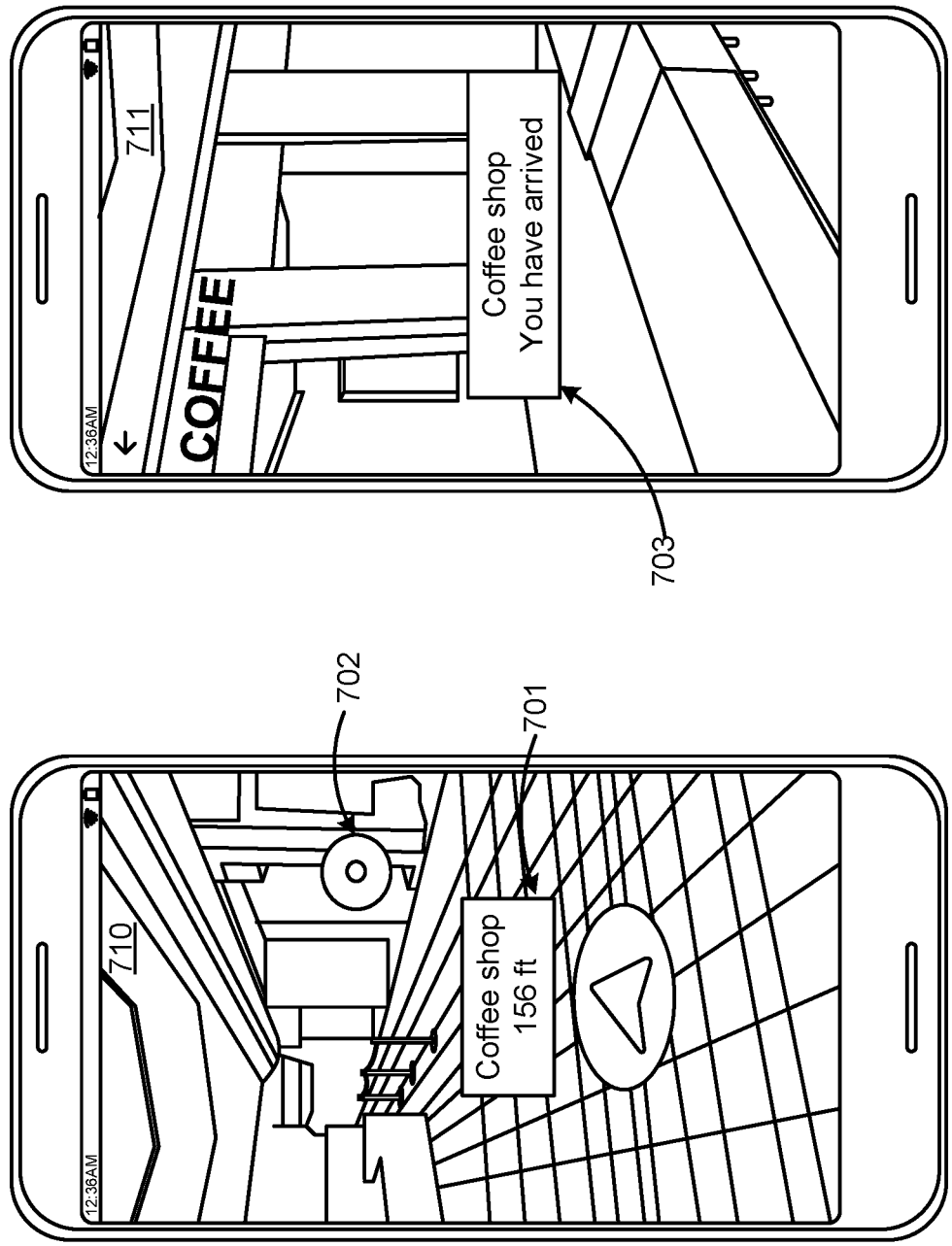

FIGS. 7A and 7B illustrate additional real-world scenes 710, 711 associated with AR objects 701 through 703 for wayfinding within a building (e.g., a specific floor of the building). In this example implementations, the AR objects 701 (an arrow pointing the direction), 702 (a destination marker) can be updated as a user is moving until the user has arrived at the location as shown by AR object 703. The AR objects 701 through 703 can be stored in and accessed from the AR server 252.

Figure 8:
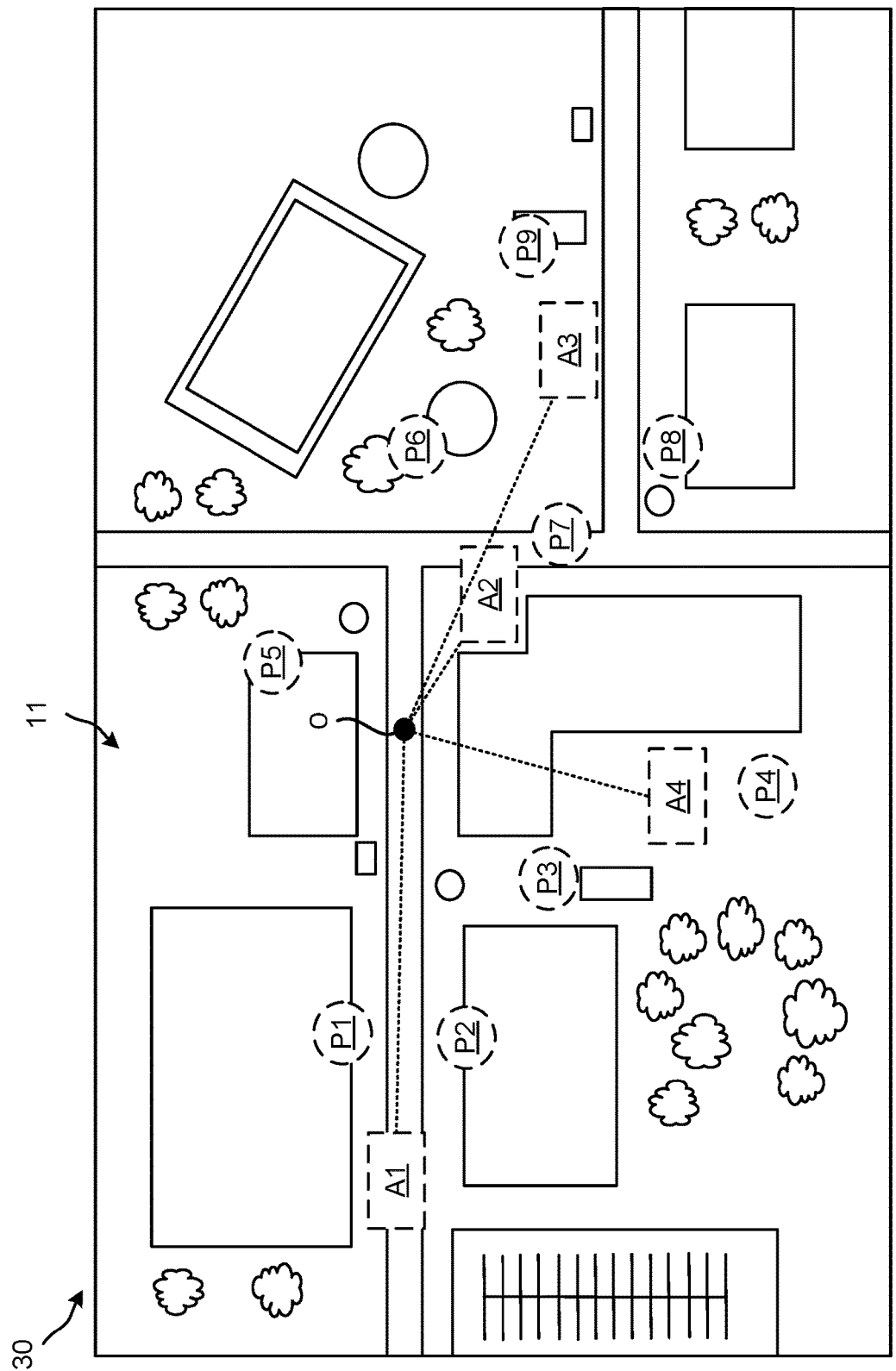
FIG. 8 is a diagram illustrating dynamic addition of an AR anchor within the model map of FIG. 3C.

FIG. 8 is a diagram illustrating dynamic addition of an AR anchor within the model map 30. Specifically, in this example, an AR anchor A4 is added to the set of AR anchors A. The AR anchor A4 can be added to a specific location to the model map 30 even after the other AR anchors A have been created (e.g., curated) and used in discovery and wayfinding. The AR anchor A4 can be used for further localization and used to identify and display AR objects P.

Being able to dynamically add AR anchors as separate localization points avoids having to re-create a full, complete, and final model of a real-world, which may be required by other systems. Additional localization AR anchors can be quickly added and used to improve the processing of the system and to localize a user 100.

Figure 9:
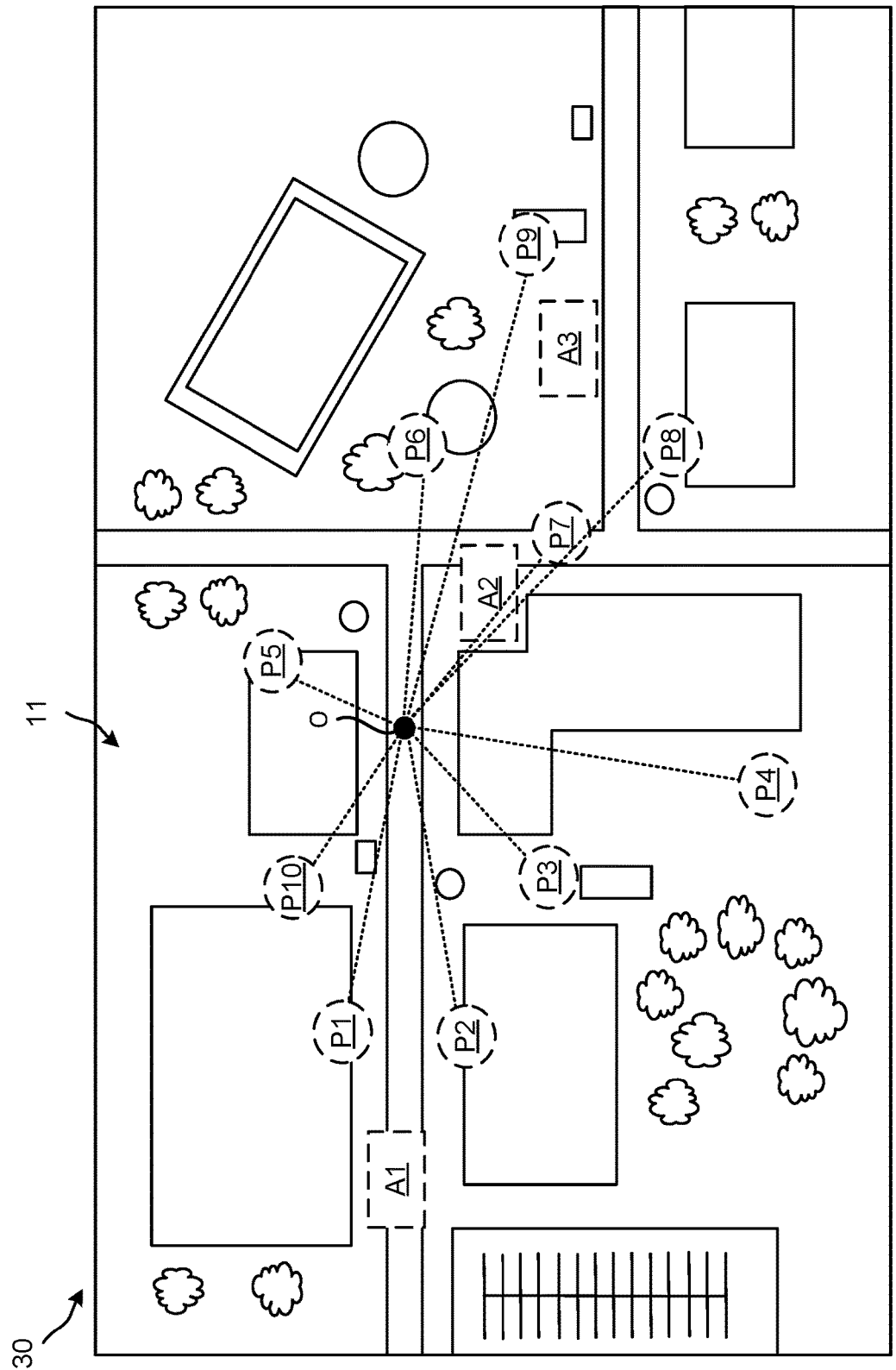
FIG. 9 is a diagram illustrating dynamic addition of an AR object within the model map of FIG. 3B.

FIG. 9 is a diagram illustrating dynamic addition of an AR anchor within the model map 30. Specifically, in this example, an AR object P10 is added to the set of AR objects P. The AR objects P10 can be added to a specific location to the model map 30 even after the other AR objects P10 have been created (e.g., curated) and used in discovery and wayfinding. In some implementations, one or more AR objects P can also be moved.

Being able to dynamically add AR objects to the model map 30 makes updating the AR world convenient. Additional AR objects can be quickly added dynamically and used to improve the AR experience without having to re-create all aspects of the model.

Figure 10:
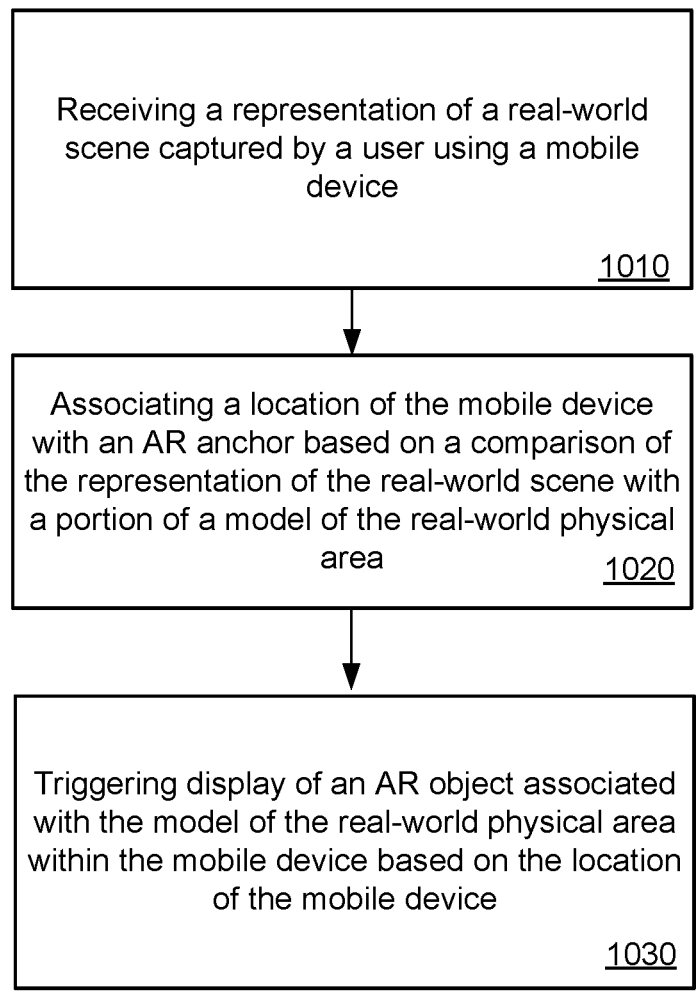
FIGS. 10 and 11 illustrate methods of discovery and/or wayfinding.

FIG. 10 illustrates a method of discovery and/or wayfinding as described herein. As shown in FIG. 10, the method includes receiving (by, for example, the AR anchor localization engine 224 shown in FIG. 2) a representation of a real-world scene captured (e.g., by a user) using a mobile device (block 1010). The real-world scene can be a portion of a real-world physical area (e.g., a venue). The capture of the real-world scene can be performed by the sensor system 210 shown in at least FIG. 2. The method includes associating a location of the mobile device with an AR anchor based on a comparison of the representation of the real-world scene with a portion of a model of the real-world physical area (block 1020). The associating of the location (e.g., localization) can be performed by, for example, the AR anchor localization engine 224 shown in FIG. 2. The method also includes triggering display of an AR object associated with the model of the real-world physical area within the mobile device based on the location of the mobile device (block 1030). The display can be triggered by, for example, one or more of the AR object retrieval engine 226, the AR presentation engine 228, and the user interface engine 230 shown in FIG. 2.

Figure 11:
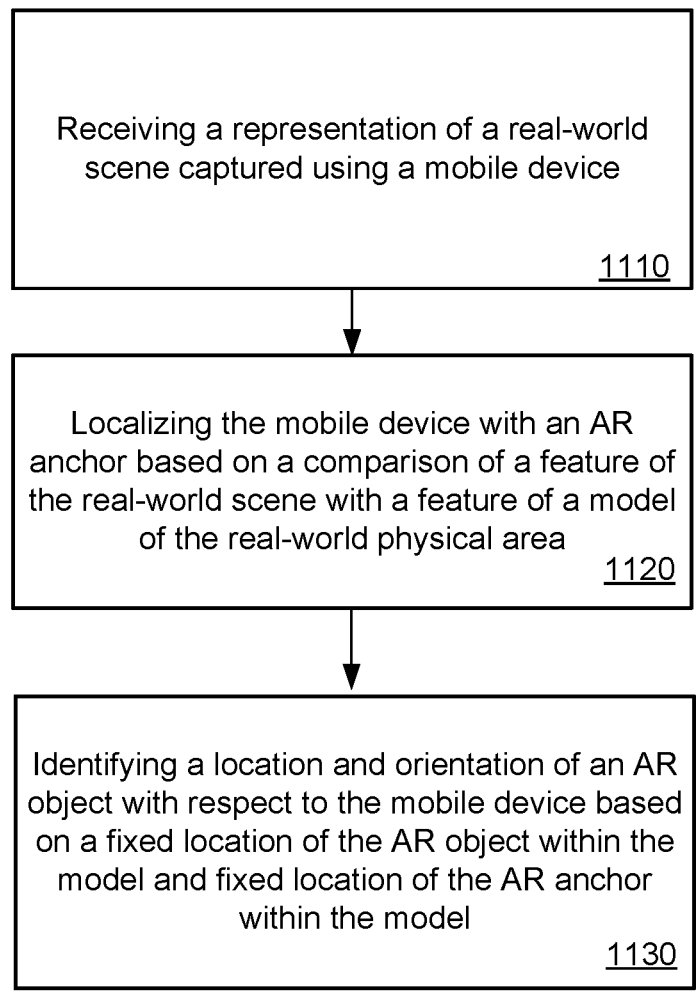

FIG. 11 illustrates a method of discovery and/or wayfinding as described herein. As shown in FIG. 10, the method includes receiving a representation of a real-world scene captured by a mobile device, the real-world scene being a portion of a real-world physical area (block 1110). The real-world scene can be a portion of a real-world physical area (e.g., a venue). The capture of the real-world scene can be performed by the sensor system 210 shown in at least FIG. 2. The method includes localizing the mobile device with an AR anchor from a plurality of AR anchors based on a comparison of a feature of the real-world scene with a feature of a model map of the real-world physical area (block 1120). The associating of the location (e.g., localization) can be performed by, for example, the AR anchor localization engine 224 shown in FIG. 2. The method also includes identifying a location and orientation of an AR object with respect to the mobile device based on a fixed location of the AR object within the model and a fixed location of the AR anchor within the model (block 1130). The identifying can be performed by, for example, one or more of the map reconciliation engine 225 or the AR object retrieval engine 226 shown in FIG. 2.

Figure 12:
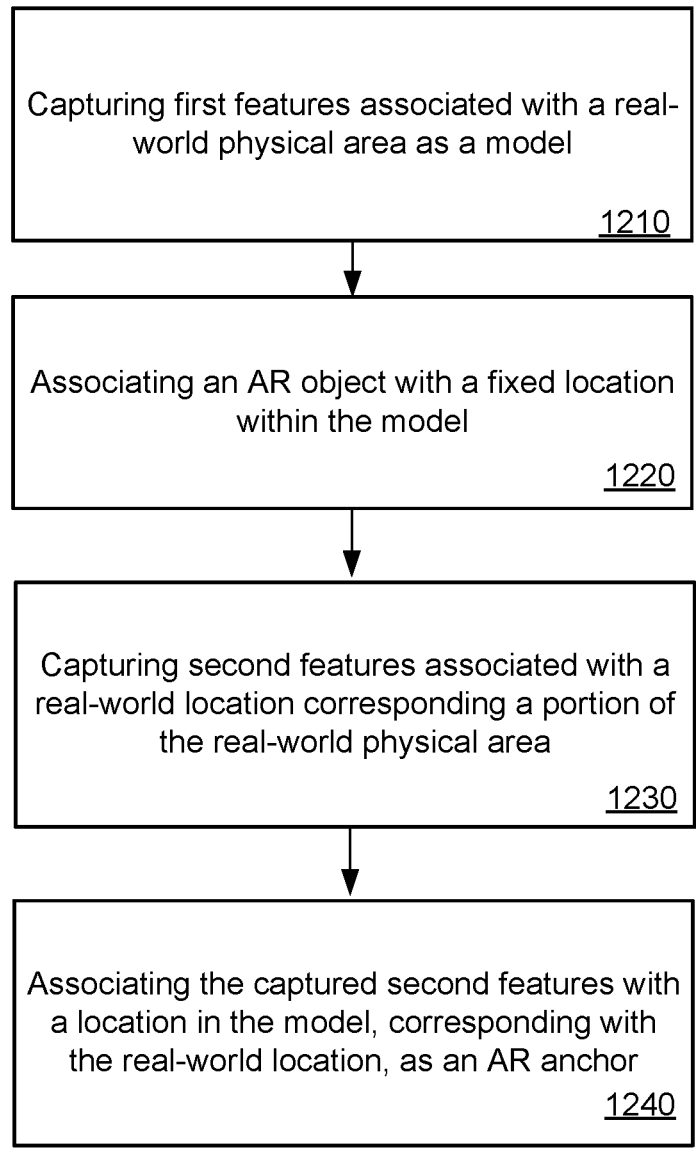
FIG. 12 illustrates a method of creating a model, and associated elements, for discovery and/or wayfinding.

FIG. 12 illustrates a method of creating a model, and associated elements, for discovery and/or wayfinding as described herein. The flowchart elements can be performed by the map and anchor creation engine 227 shown in FIG. 2.

The method can include capturing first features associated with a real-world physical area as a model (block 1210), and associating an AR object with a fixed location within the model (block 1220). In some implementations, the AR object can be associated with a fixed location and fixed orientation within the model. The method can include capturing second features associated with a real-world location corresponding with a portion of the real-world physical area (block 1230), and associating the captured second features with a location in the model, corresponding with the real-world location, as an AR anchor (block 1240). In some implementations, one or more of the features can be captured in an image or a point cloud.

Referring back to FIG. 2, the IMU 214 can be configured to detect motion, movement, and/or acceleration of the mobile device 110. The IMU 214 may include various different types of sensors such as, for example, an accelerometer, a gyroscope, a magnetometer, and other such sensors. An orientation of the mobile device 110 may be detected and tracked based on data provided by the IMU 214 or GPS receiver 216.

The GPS receiver 216 may receive signals emitted by GPS satellites. The signals include a time and position of the satellite. Based on receiving signals from several satellites (e.g., at least four), the GPS receiver 216 may determine a global position of the mobile device 110.

The other applications 240 include any other applications that are installed or otherwise available for execution on the mobile device 110. In some implementations, the application 222 may cause one of the other applications 240 to be launched.

The device positioning system 242 determines a position of the mobile computing device 202. The device positioning system 242 may use the sensor system 210 to determine a location and orientation of the mobile computing device 202 globally or within a physical space.

The AR anchor localization engine 224 may include a machine learning module that can recognize at least some types of entities within an image. For example, the machine learning module may include a neural network system. Neural networks are computational models used in machine learning and made up of nodes organized in layers with weighted connections. Training a neural network uses training examples, each example being an input and a desired output, to determine, over a series of iterative rounds, weight values for the connections between layers that increase the likelihood of the neural network providing the desired output for a given input. During each training round, the weights are adjusted to address incorrect output values. Once trained, the neural network can be used to predict an output based on provided input.

In some implementations, the neural network system includes a convolution neural network (CNN). A convolutional neural network (CNN) is a neural network in which at least one of the layers of the neural network is a convolutional layer. A convolutional layer is a layer in which the values of a layer are calculated based on applying a kernel function to a subset of the values of a previous layer. Training the neural network may involve adjusting weights of the kernel function based on the training examples. Typically, the same kernel function is used to calculate each value in a convolutional layer. Accordingly, there are far fewer weights that must be learned while training a convolutional layer than a fully-connected layer (e.g., a layer in which each value in a layer is a calculated as an independently adjusted weighted combination of each value in the previous layer) in a neural network. Because there are typically fewer weights in the convolutional layer, training and using a convolutional layer may require less memory, processor cycles, and time than would an equivalent fully-connected layer.

The communication module 206 includes one or more devices for communicating with other computing devices, such as the AR server 252. The communication module 206 may communicate via wireless or wired networks, such as the network 290. The communication module 256 of the AR server 252 may be similar to the communication module 206. The network 290 may be the Internet, a local area network (LAN), a wireless local area network (WLAN), and/or any other network.

The display device 208 may, for example, include an LCD (liquid crystal display) screen, an LED (light emitting diode) screen, an OLED (organic light emitting diode) screen, a touchscreen, or any other screen or display for displaying images or information to a user. In some implementations, the display device 208 includes a light projector arranged to project light onto a portion of a user's eye.

The memory 220 can include one or more non-transitory computer-readable storage media. The memory 220 may store instructions and data that are usable by the mobile device 110 to implement the technologies described herein, such as to generate visual-content queries based on captured images, transmit visual-content queries, receive responses to the visual-content queries, and present a digital supplement identified in a response to a visual-content query. The memory 260 of the AR server 252 may be similar to the memory 220 and may store data instructions that are usable to implement the technology of the AR server 252.

The processor assembly 204 and/or processor assembly 254 includes one or more devices that are capable of executing instructions, such as instructions stored by the memory 220, to perform various tasks. For example, one or more of the processor assemblies 204, 254 may include a central processing unit (CPU) and/or a graphics processor unit (GPU). For example, if a GPU is present, some image/video rendering tasks, such as generating and displaying a user interface or displaying portions of a digital supplement may be offloaded from the CPU to the GPU. In some implementations, some image recognition tasks may also be offloaded from the CPU to the GPU.

Although FIG. 2 does not show it, some implementations include a head-mounted display device (HMD) (e.g., glasses that are AR enabled). The HMD may be a separate device from the mobile device 110 or the mobile device 110 may include the HMD. In some implementations, the mobile device 110 communicates with the HMD via a cable. For example, the mobile device 110 may transmit video signals and/or audio signals to the HMD for display for the user, and the HMD may transmit motion, position, and/or orientation information to the mobile device 110.

The mobile device 110 may also include various user input components (not shown) such as a controller that communicates with the mobile device 110 using a wireless communications protocol. In some implementations, the mobile device 110 may communicate via a wired connection (e.g., a Universal Serial Bus (USB) cable) or via a wireless communication protocol (e.g., any WiFi protocol, any BluTooth protocol, Zigbee, etc.) with a HMD (not shown). In some implementations, the mobile device 110 is a component of the HMD and may be contained within a housing of the HMD.

Figure 13:
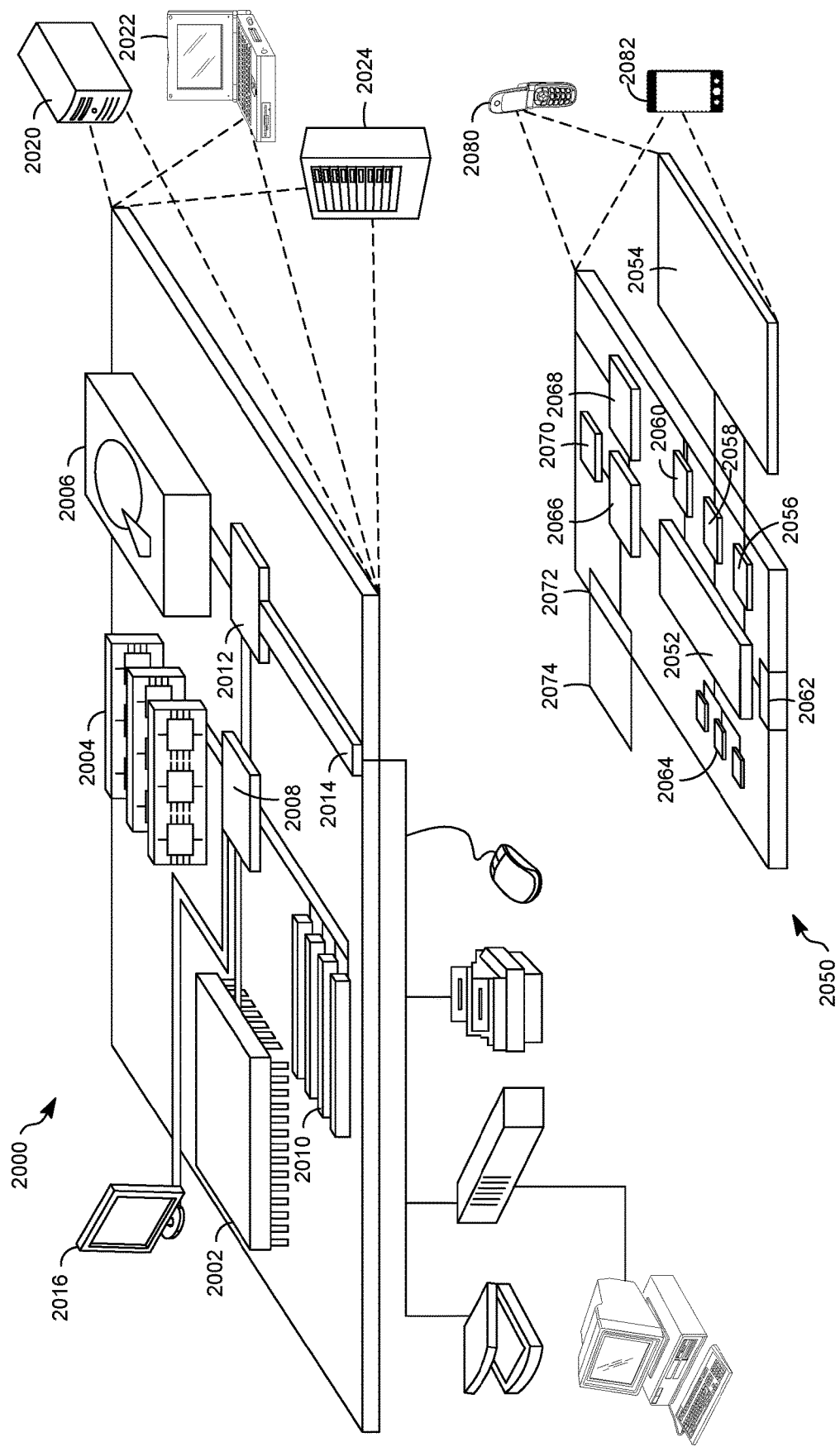
FIG. 13 shows an example of a generic computer device and a generic mobile computer device.

FIG. 13 shows an example of a generic computer device 2000 and a generic mobile computer device 2050, which may be used with the techniques described herein. Computing device 2000 is intended to represent various forms of digital computers, such as laptops, desktops, tablets, workstations, personal digital assistants, televisions, servers, blade servers, mainframes, and other appropriate computing devices. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. The processor 2002 can be a semiconductor-based processor. The memory 2004 can be a semiconductor-based memory. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A non-transitory machine-readable, tangible medium storing instructions, which may be read and executed by one or more processors to perform a method, the method including:
   capturing first features associated with a real-world physical area as a model, the model of the real-world physical area having a coordinate space;
   defining an augmented reality (AR) object within a coordinate space of the AR object, the AR object having a location associated with the real-world physical area via the coordinate space of the AR object;
   capturing second features corresponding with a portion of the real-world physical area; and
   associating the second features with a location in the model, corresponding with the portion of the real-world physical area, as an AR anchor, the AR anchor being associated with a coordinate space of the AR anchor to enable discovery of the AR object by a user within the real-world physical area,
   the coordinate space of the AR anchor being independent of the coordinate space of the model of the real-world physical area to enable dynamic updating of at least one of the model or the AR anchor, the AR anchor being included in a plurality of anchors, the plurality of anchors having a location and orientation with respect to an origin.

2. The non-transitory machine-readable, tangible medium of claim 1, wherein the model is a 1:1 scale representation of the real-world physical area.

3. The non-transitory machine-readable, tangible medium of claim 1, wherein the AR object has an orientation within the model.

4. The non-transitory machine-readable, tangible medium of claim 1, wherein the second features of the AR anchor includes a panorama.

5. The non-transitory machine-readable, tangible medium of claim 1, wherein the location of the AR object is with respect to an origin of the coordinate space of the model of the real-world physical area.

6. The non-transitory machine-readable, tangible medium of claim 1, wherein the location in the model of the AR anchor is fixed with respect to an origin of the coordinate space of the model of the real-world physical area.

7. The non-transitory machine-readable, tangible medium of claim 1, wherein the AR anchor is a first AR anchor, the portion of the real-world physical area is a first portion, the location in the model is a first location in the model;
   the method further including:
      capturing third features associated with a second portion of the real-world physical area, the first portion being different from the second portion; and
      associating the third features with a second location in the coordinate space of the model of the real-world physical area as a second AR anchor.

8. A non-transitory machine-readable, tangible medium storing instructions, which may be read and executed by one or more processors to perform a method, the method including:
   capturing first features associated with a real-world physical area as a model;
   defining a fixed location of an augmented reality (AR) object corresponding with a coordinate space of the model;
   capturing second features corresponding with a portion of the real-world physical area; and
   associating the second features with a location in the model, corresponding with the portion of the real-world physical area, as a first AR anchor in a coordinate space of the first AR anchor to enable discovery of the AR object by a user within the real-world physical area,
   the coordinate space of the model being independent of the coordinate space of the first AR anchor to enable at least one of an update of the model or an addition of a second AR anchor within the coordinate space of the first AR anchor, the coordinate space of the model having an origin corresponding to an origin of the coordinate space of the first AR anchor.

9. The non-transitory machine-readable, tangible medium of claim 8, wherein the AR object has an orientation with the model.

10. The non-transitory machine-readable, tangible medium of claim 8, wherein the second features of the first AR anchor includes a panorama.

11. The non-transitory machine-readable, tangible medium of claim 8, wherein the location of the AR object is with respect to an origin of the coordinate space of the model.

12. The non-transitory machine-readable, tangible medium of claim 8, wherein the location in the model of the first AR anchor is fixed with respect to an origin of the coordinate space of the model.

13. The non-transitory machine-readable, tangible medium of claim 8, wherein the portion of the real-world physical area is a first portion, the location in the model is a first location in the model;
   the method further including
      capturing third features associated with a second portion of the real-world physical area, the first portion being different from the second portion; and
      associating the third features with a second location in the model as the second AR anchor.

14. A non-transitory machine-readable, tangible medium storing instructions, which may be read and executed by one or more processors to perform a method, the method including:
   capturing first features associated with a real-world physical area as a model;
   associating an augmented reality (AR) object with a first location in the model;
   capturing second features associated with a real-world location corresponding with a portion of the real-world physical area; and
   associating the second features with a second location in the model, corresponding with the real-world location, as an AR anchor, the AR anchor being a collection of points that represent features at the second location within the model that enable discovery of the AR object by a user within the real-world physical area, the model and the AR anchor have a common origin.

15. The non-transitory machine-readable, tangible medium of claim 14, wherein the AR object has an orientation with the model.

16. The non-transitory machine-readable, tangible medium of claim 14, wherein the second features of the AR anchor includes a panorama.

17. The non-transitory machine-readable, tangible medium of claim 14, wherein the first location of the AR object is with respect to an origin of the model.

18. The non-transitory machine-readable, tangible medium of claim 14, wherein the second location in the model of the AR anchor is fixed with respect to an origin of the model.

19. The non-transitory machine-readable, tangible medium of claim 14, wherein the AR anchor is a first AR anchor, the real-world location is a first real-world location, the portion is a first portion;
 the method further including:
  capturing third features associated with a second real-world location corresponding with a second portion of the real-world physical area, the first portion being different from the second portion; and
  associating the third features with a third location in the model as a second AR anchor.

20. The non-transitory machine-readable, tangible medium of claim 14, wherein the model is a point cloud representation that includes points in a three-dimensional (3D) space that represent a plurality of features within the real-world physical area.

21. The non-transitory machine-readable, tangible medium of claim 14, wherein the AR anchor is unique.

* * * * *